(12) United States Patent
Katoh et al.

(10) Patent No.: US 7,201,457 B2
(45) Date of Patent: Apr. 10, 2007

(54) RUBBER CRAWLER AND CRAWLER TRAVELING EQUIPMENT

(75) Inventors: Yusaku Katoh, Fukuyama (JP); Tatsuya Noritoh, Ibara (JP); Hideki Kimura, Fukuyama (JP)

(73) Assignee: Fukuyama Gomu Kogyo Kabushiki Gaisha, Fukuyama (JP)

( * ) Notice: Subject to any disclaimer, the term of this patent is extended or adjusted under 35 U.S.C. 154(b) by 111 days.

(21) Appl. No.: 10/507,633

(22) PCT Filed: Mar. 13, 2003

(86) PCT No.: PCT/JP03/03039

§ 371 (c)(1),
(2), (4) Date: Sep. 14, 2004

(87) PCT Pub. No.: WO03/078239

PCT Pub. Date: Sep. 25, 2003

(65) Prior Publication Data

US 2005/0116540 A1    Jun. 2, 2005

(30) Foreign Application Priority Data

Mar. 15, 2002  (JP)  ............................. 2002-072007

(51) Int. Cl.
*B62D 55/253*     (2006.01)
(52) U.S. Cl. .................. 305/194; 305/165; 305/171; 305/184
(58) Field of Classification Search ............... 305/159, 305/165, 171, 172, 173, 174, 175, 176, 177, 305/178, 184, 193, 194, 195, 199
See application file for complete search history.

(56) References Cited

U.S. PATENT DOCUMENTS

| | | | | |
|---|---|---|---|---|
| 1,627,287 A | * | 5/1927 | Kegresse | 305/184 |
| 1,820,882 A | * | 8/1931 | Engstrom | 305/184 |
| 1,895,241 A | * | 1/1933 | Worley | 305/152 |
| 1,986,865 A | * | 1/1935 | Tschappat | 305/34 |

(Continued)

FOREIGN PATENT DOCUMENTS

JP         55-55064     *   4/1980

(Continued)

OTHER PUBLICATIONS

Microfilm of the specification and drawings annexed to the request of Japanese Utility Model Application No. 85971/1978 (Laid-open No. 2757/1980), Masaru Ide. Jan. 9, 1980.

(Continued)

*Primary Examiner*—Russell D. Stormer
(74) *Attorney, Agent, or Firm*—Merek, Blackmon & Voorhees, LLC

(57) ABSTRACT

Rubber crawler equipment (1) capable of reducing the weight and cost of a rubber crawler, and providing a lightweight and fast drive for tires and crawlers, wherein core members (5) formed of plastic material instead of metal are embedded in a rubber crawler (2), and the rubber crawler (2) is suspendedly installed on tires (3, 4), whereby the rubber crawler (2) can be easily attached and detached, and the extension thereof can be adjusted by regulating the internal pressure of a hollow tire (3).

2 Claims, 22 Drawing Sheets

U.S. PATENT DOCUMENTS

| | | | | |
|---|---|---|---|---|
| 2,898,965 | A | * | 8/1959 | Eddy .......................... 152/175 |
| RE33,324 | E | * | 9/1990 | Edwards et al. ............ 305/182 |
| 5,005,922 | A | * | 4/1991 | Edwards et al. ............ 305/184 |
| 5,018,591 | A | * | 5/1991 | Price .......................... 180/9.5 |
| 5,020,865 | A | * | 6/1991 | Edwards et al. ............ 305/182 |
| 5,447,365 | A | * | 9/1995 | Muramatsu et al. ........ 305/171 |
| 5,593,218 | A | * | 1/1997 | Katoh et al. ................. 305/174 |
| 5,632,537 | A | * | 5/1997 | Yoshimura et al. ......... 305/173 |

FOREIGN PATENT DOCUMENTS

| | | | |
|---|---|---|---|
| JP | 55-55065 | * | 4/1980 |
| JP | 55-55066 | * | 4/1980 |
| JP | 55-68476 | * | 5/1980 |
| JP | 55-68477 | * | 5/1980 |
| JP | 55-68478 | * | 5/1980 |
| JP | 4-62912 | | 10/1992 |
| JP | 8-258757 | | 10/1996 |
| JP | 11-171062 | | 6/1999 |
| JP | 3-132874 | | 11/2000 |
| JP | 3-318723 | | 6/2002 |
| JP | 3-318733 | | 6/2002 |

OTHER PUBLICATIONS

Microfilm of the specification and drawings annexed to the request of Japanese Utility Model Application No. 1155/1979 (Laid-open No. 102683/1980). Manabu Tsurumi. Jul. 17, 1980.

Microfilm of the specification and drawings annexed to the request of Japanese Utility Model Application No. 31081/1989 (Laid-open No. 121493/1990). Fukuyama Gomu Kogyo Kabushiki Kaisha. Oct. 2, 1990.

* cited by examiner

A

B

C

A

B

A

B

C

A

B

C

A

B

A

B

C

RUBBER CRAWLER AND CRAWLER TRAVELING EQUIPMENT

TECHNICAL FIELD

The present invention relates to rubber crawlers of the type that are installed on tires of industrial vehicles such as construction machines, civil work machines, agricultural vehicles, carriers, snow removing vehicles and cargo vehicles, such as fork lift trucks. The present invention also relates to crawler drives incorporating such rubber crawlers.

PRIOR ART

Skid steering industrial vehicles using tires are described in Japanese Patent publication No. 30588 of 1985 (FIG. 19A), Japanese Patent Publication No. 5400 of 1996, Japanese Utility Model Laid-open Publication No. 91387 of 1980 (FIG. 19C), Japanese Utility Model Laid-open Publication No. 125066 of 1990 and Japanese Utility Model Publication No. 24439 of 1995 (FIG. 19B). There are, for example, skid steering loaders shown in FIG. 19A and FIG. 19B and a multiwheeled vehicle shown in FIG. 19C. In these figures, 13 is a tire.

Besides, a crawler drive for an agricultural vehicle such as a combine or a harvester is disclosed in Japanese Patent Laid-open Publication No. 011361 of 1999, and a crawler drive for a construction vehicle is disclosed in Japanese Utility Model No. 2523571, as a conventional crawler drive.

The conventional crawler drive is so constructed that a crawler is suspended on a coupled driving wheel (an idler) and a driving wheel (a sprocket), and is guided by a plurality of carrying wheels axially supported by a truck frame.

A conventional rubber crawler suspended around and used on a conventional crawler drive is shown in FIG. 20. As shown in the figure, the conventional rubber crawler 12 comprises a rubber crawler main body formed of an endless rubber belt 12a made of a rubber elastic body and so on, a tensile strength layer 12b, and metallic core members 12c embedded in the rubber belt. The tensile strength layer 12b comprises tensile strength body rows each having a plurality of steel cords extending in the circumferential direction within a cross direction of the rubber crawler. The core members 12c are embedded on the inner side of the tensile strength layer 12b, with respect to the thickness direction of the endless rubber belt 12a, at a fixed interval. And guide protrusions 12c' for preventing the crawler from coming off the crawler drive protrude from the inside of the crawler.

Although many vehicles with tires 13 are used as conventional skid steering industrial vehicles, they are not used on soft ground because the tires 13 sink therein. In such cases, vehicles having crawlers, such as rubber crawlers 12 that have high mobility with low ground pressure, even on damp ground or poor ground, are used. The rubber crawler 12 is shown in FIG. 21.

However, since the conventional crawler drives are for crawlers only, they must be manufactured separately from drives for tires. Therefore, the cost becomes great.

Besides, since a crawler can not be installed on a skid steering industrial vehicle with tires during use, a new skid steering industrial vehicle designed for crawlers must be made.

In a crawler drive wherein a rubber crawler is suspended around coupled driving wheels and driving wheels, as well as around a plurality of carrying wheels axially supporting the crawler on a truck frame guide and travel, metallic core members are embedded in the rubber crawler at a fixed interval to keep the rubber crawler rigid. Therefore, the rubber crawler becomes heavy, and the crawler can not travel at high speed.

The present invention aims to solve the above-mentioned problems. The first aim is to provide a rubber crawler and rubber crawler equipment that are lightweight, capable of traveling at high speed, and economical in cost. To accomplish the aim, core members formed of thermoplastics, thermosetting plastics, urethane resins, blend material or a bridging material composed of these and rubber, or high hardness rubber, are embedded in a rubber crawler instead of metallic core members so as to make the rubber crawler rigid and transmit driving force to the rubber crawler surely.

The second aim of the present invention is to provide a crawler capable of common use with tires and with crawler drives to solve the problem of increased cost caused by separately manufacturing them.

In this case, there occurs a new problem due to making a crawler for use with both tires and crawler drives. The problem occurs because a device for adjusting crawler extension, which helps a crawler of a conventional crawler drive to be suspendedly installed on idlers (coupled driving wheels) and sprockets (driving wheels) and adjusts the extension thereof, is not provided on the drives for tires. Therefore, the present invention also aims to provide skid steering drives capable of use with both tires and crawlers.

For reference, a screw device 14a disclosed in Japanese Patent Laid-open Publication No. 011361 of 1999 is shown in FIG. 22A as an example of a device for adjusting crawler extension. Besides, a grease device 14b for adjusting crawler extension shown in FIG. 22B, wherein grease is injected by a grease pump 15 to adjust the extension of crawler, is already known.

SUMMARY OF INVENTION

A first aspect of the invention to accomplish the above-mentioned aims comprises a rubber crawler so constructed that core members formed of thermoplastics such as polyethylene and vinyl chloride, thermosetting plastics, urethane resins, hard rubber, blend material or bridging material composed of these plastics and rubber, or high hardness rubber elastic body, instead of metallic core members, are embedded in a rubber crawler at a fixed interval. In this way, the rubber crawler can be reduced in weight, travel at high speed, and stay rigid.

A second aspect of the invention comprises a traveling equipment capable of driving a rubber crawler comfortably, and of common use with tires and crawler drive by suspending a crawler on the tires of traveling equipments.

The following construction is made to solve inconveniences due to the absence of devices for adjusting crawler extension in a drive for tires, which are new problems caused by suspendedly installing a crawler on a drive for tires, namely, that installing a crawler on tires is difficult and the extension of the crawler can not be adjusted.

In drives for tires, each drive, arranged respectively on left and right sides of a vehicle, comprises at least two wheels, wherein at least one or the other of the front and rear tires, in the longitudinal direction of the vehicle, is formed as a hollow tire. The outside diameter dimension of the hollow tire is enlarged and reduced by injection and ejection of air or liquid to its hollow part, thereby enabling easy installation and disconnection of the crawler. Besides, the drives are made in a skid steering type for adjusting the extension of the crawler by regulating the internal pressure of the hollow tire. For example, although a conventional air tire eliminating a carcass therefrom can be used as the above-mentioned hollow tire, the present invention is not limited to such a tire.

The rubber crawler comprises an endless rubber belt made of rubber elastic material and resin material, a tensile strength layer embedded therein, and guide protrusions for preventing the crawler from coming off of the tires (wheels) of the drive. The tensile strength layer comprises a plurality of parallel tensile strength bodies arranged in rows within the cross direction of the crawler and extending in the circumferential direction thereof. The guide protrusions are protrusively formed on the inside circumference of the crawler at a fixed interval.

It is preferable that core members are embedded in the rubber belt at a fixed interval to increase the rigidity of the crawler.

The present invention is characterized in that the core members are formed of thermoplastics such as polyethylene and vinyl chloride, thermosetting plastics, urethane resins, a blend material or a bridging material composed of these plastics and rubber, or a high hardness rubber.

In this case, strength bodies such as steel cords and strength fibers may be embedded in the core members to reinforce them.

Therefore, the weight of such a core member is lighter than conventional metallic core members, thereby lightening the rubber crawler itself, as well as enabling the rubber crawler to travel at high speed. Besides, since the core members are formed of plastic material or the like, they can be integrally and fusedly adhered to the rubber elastic material and the resin material of the rubber belt forming the rubber crawler body.

It is preferable that the core members are embedded in the guide protrusions of the rubber crawler, too. In this case, the core members increase the strength of the guide protrusions.

When the core members are embedded in the rubber crawler, a part of them may be embedded so as to be exposed on the inside circumference of the rubber crawler. Therefore, the rubber of the inside circumference can be prevented from wearing due to friction with the tires.

Although it is preferable that the drive of the present invention uses a rubber crawler in which core members formed of plastic material are embedded, the rubber crawler does not necessarily need the core members. Furthermore, core members formed of high hardness rubber or metal such as iron can be used.

It is preferable that the guide protrusions are protrusively formed at both ends, in the cross direction of the rubber crawler, in an angular U shape at a fixed interval along the circumferential direction, so as to sandwich the sides of the tire. Besides, they may be protrusively formed at the center, in the cross direction of the rubber crawler, in a T shape, or at both ends and the center. Moreover, the guide protrusions are not limited to the described embodiments; they may be in any shape that prevents the crawler from coming off of the tires.

Although steel cords are generally used as the tensile strength bodies of the rubber crawler, fiber or cloth formed of vinylon, nylon, Tetron, Vectran and Kevlar may be used, and other tensile strength materials may be used. In this case, the tensile strength bodies can be embedded in the rubber belt in one, two or more tensile strength layers. In the case of a plurality of layers, the material of each tensile strength layer may be the same or different, and its form may be linear, cloth or bias. When the core members or the metallic core members are embedded in the rubber belt, the tensile strength layers may be provided on both the inside and the outside of the core members, with respect to the circumferential direction of the rubber crawler, or may be provided on either of them.

As the material of the rubber belt can be used natural rubber, synthetic rubber (SBR, BR, JR, urethane and so on), a blend of rubber formed of some of these, or a blend of rubber formed of these and a high molecular resin, such as a high styrene resin including a reinforcer, such as carbon black, filler, antioxidant, vulcanization accelerator, and a curing agent. These additional agents are suitably selected and blended in view of the working conditions of the rubber crawler, the durability, the cost, and so on. Furthermore, the rubber belt may be mainly composed of a plastic resin, such as polyethylene and polyvinyl chloride, and polyurethane resin.

Besides, the endless rubber belt of the present invention is not limited to these.

The skid steering drive of the present invention is so constructed that each of the drives arranged on opposite sides of the vehicle is made as a tire drive comprising at least two tires, and a rubber crawler is suspendedly installed on the tires at both the front and rear ends of the drive.

According to this, a drive can serve as a drive according to a tire specification and a drive according to a crawler specification, thereby reducing the cost. When the industrial vehicle must travel on damp ground, soft ground, or snow, it is provided with rubber crawlers, to travel with the crawlers. In places where rubber crawlers are unnecessary, the industrial vehicle has the rubber crawlers taken off in order to travel with the tires. It is possible to select the tires or the crawlers suitably in accordance with the driving place.

Besides, at least one or the other of the front and rear tires of the drive on which the crawler is suspended is formed as a hollow tire. The outside diameter dimension of the hollow tire can be enlarged and reduced by the injection and ejection of air.

According to this, a crawler can be easily installed on the tires, and trouble due to the absence of a mechanism for adjusting the extension thereof in the conventional drive for tires can be avoided. That is, when the outside diameters of the tires are reduced by ejecting the air therefrom in order to suspendedly install the crawler thereon, and thereafter are enlarged by injecting air to return to the original dimension, it is easy to install and remove the crawler smoothly. Besides, injecting the air in the hollow tire and enlarging the outside diameter thereof can solve the crawler looseness caused by friction of the inside circumferences of the crawler and the tires during driving.

Furthermore, it is preferable that a pressure-reducing device forcedly ejects the air from the hollow tire. Instead of the air, liquid such as grease may be injected and ejected to enlarge and reduce the outside diameter of the tires.

The other tires of the drive may be usual air tires, solid tires, solid tires perforated on the side surfaces, or metal wheels.

In this case, it is preferable that the side surfaces of the tires be provided with hard covers made of metal or plastic and sideboards made of metal or hard plastic. According to this, the crawler's derailment is prevented effectively, and the side surfaces of the tires are prevented from damage due to friction with the guide protrusions. Besides, the rubber crawler can be provided with protrusions on the sideboards to drive the rubber crawler.

Next, the drive of the present invention can drive the rubber crawler by engaging the guide protrusions with engaging holes provided on the tires and transmitting driving force to the crawler through the tires. Besides, there is a method for transmitting the driving force through the friction between the tires and the crawler. Moreover, there is a method for transmitting the driving force through an engagement of sprocket teeth provided on the tires with the engaging holes. Furthermore, the rubber crawler may be driven by a timing belt method for engaging gear driving protrusions provided on the outside surfaces of driving tires with small driving protrusions provided between the guide protrusions on the inside circumference thereof. Besides, the driving force due to the friction between the tires and the crawler may be used together with the driving force due to the engagement of the guide protrusions of the crawler with the engaging holes of the tires or the engagement of the engaging holes of the crawler with the sprocket teeth.

When the friction between the tires and the crawler transmits the driving force, it is preferable that small slots or small protrusions are provided on the outside circumferences of the tires or the inside circumferences of the crawlers to increase the friction, as well as to prevent slipping. The small protrusions may be arranged horizontally in the cross direction and may be formed in a V shape. Besides, they may be provided along the total width in the cross direction or divided into pluralities, such as two or three in the cross direction. In case they are divided into the pluralities, they may be arranged at the same positions on the left and right and may be in a staggered arrangement.

It is preferable that the inside circumference of the rubber crawler has the central part in the cross direction made high and the edges thereof made low. According to this, mud drainage is good, thereby preventing mud from gathering between the crawler and the tires, preventing the crawler from coming off of the tires, and preventing the crawler from breaking because of abnormal tension owing to clogging mud. Besides, when the crawler shifts from the tires, the above-mentioned shape puts back the crawler to the center to correct its side drift, thereby preventing the crawler from coming off.

PREFERRED EMBODIMENT OF THE INVENTION

Embodiments of the present invention are explained according to drawings as follows.

Figure 1:
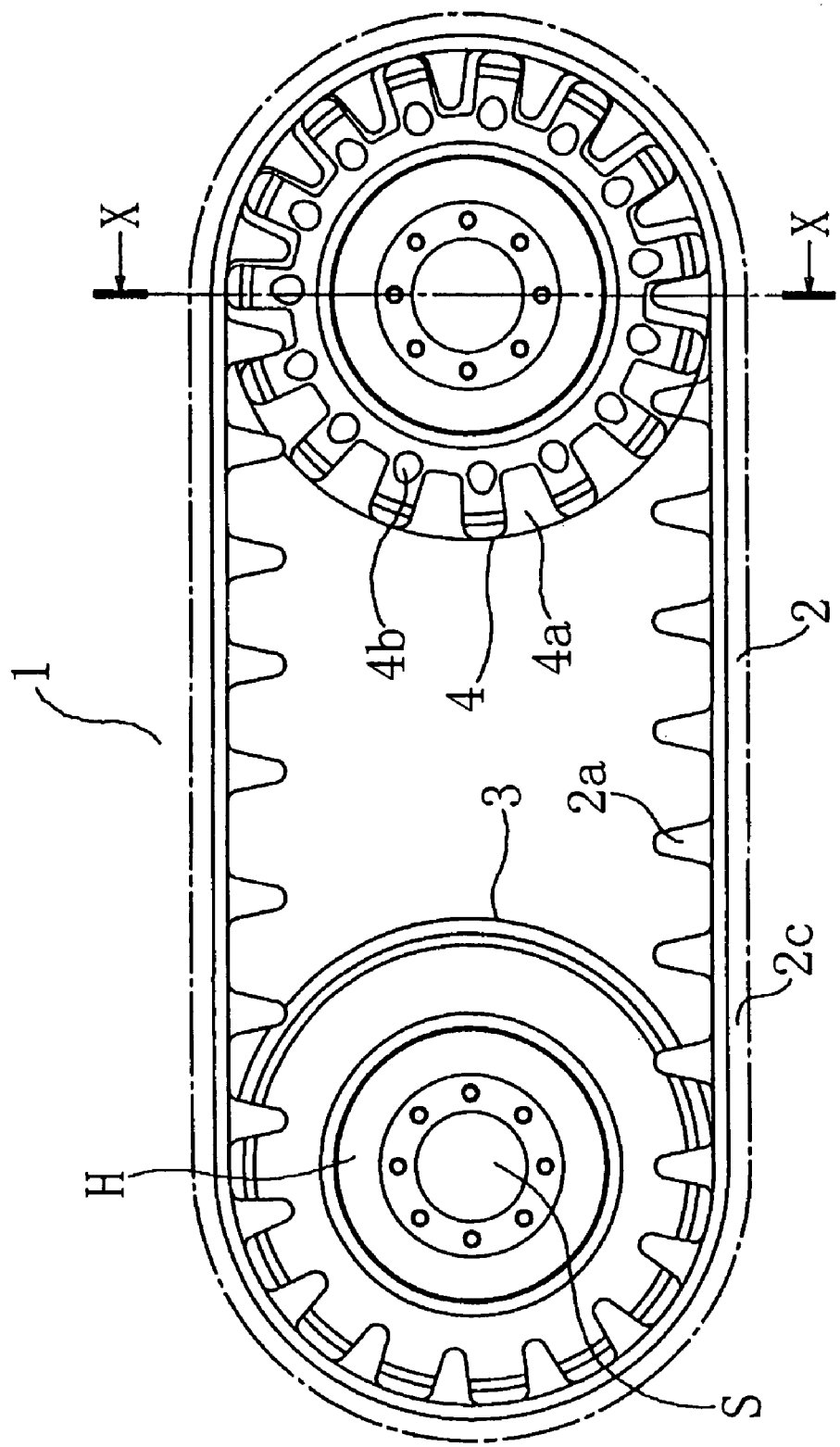
FIG. 1 is a side view of a crawler drive.
Figure 2:
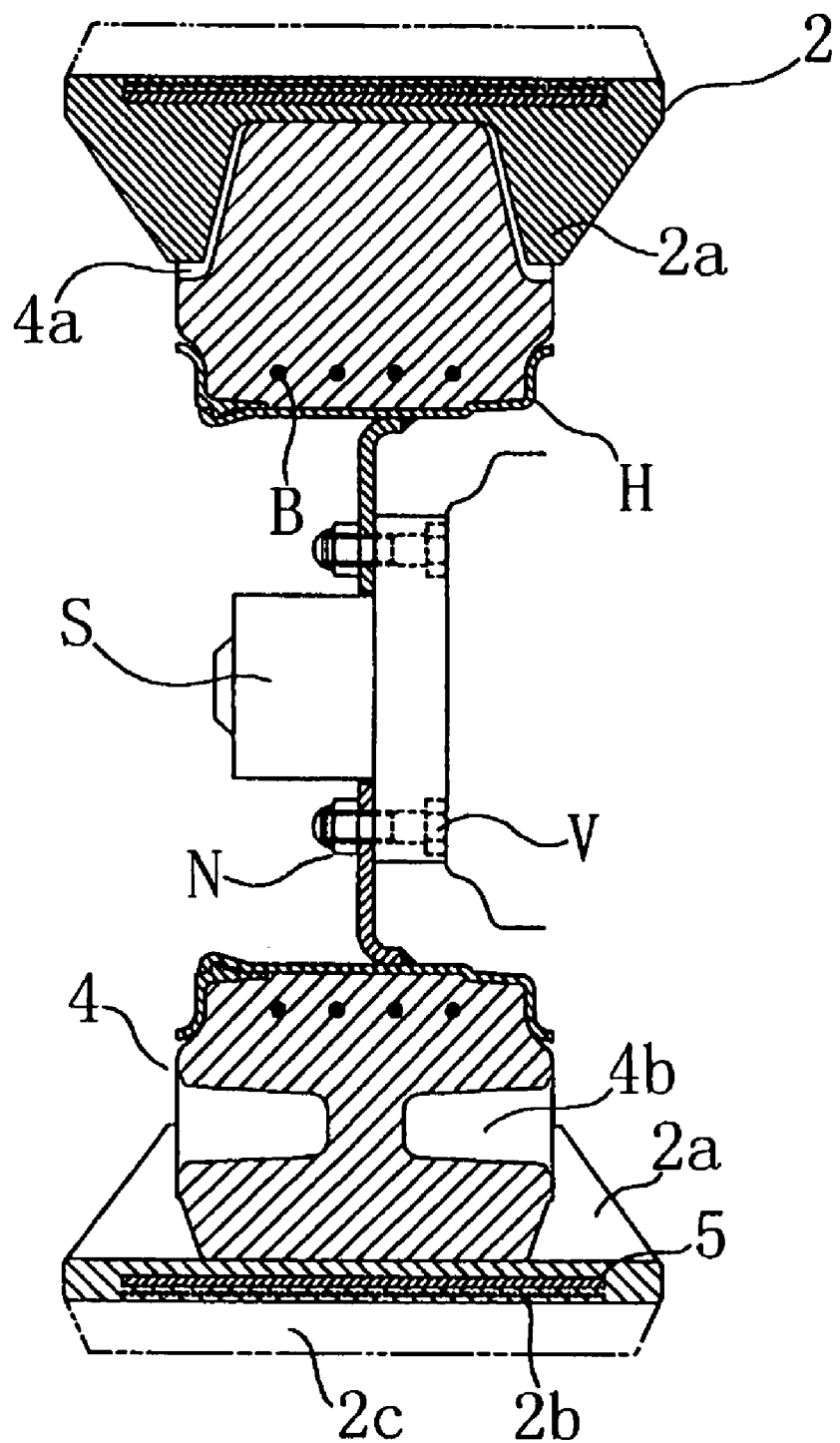
FIG. 2 is a section view taken along the line X—X of FIG. 1.

FIG. 1 is a side view of a rubber crawler drive according to the present invention, and FIG. 2 is a section view taken along the line X—X of FIG. 1.

FIGS. 1 and 2 show a drive 1 according to a first embodiment of the present invention, in which is a skid steering vehicle 1 has a rubber crawler 2 installed on tires 3, 4. In this embodiment, the rubber crawler 2 is suspendedly installed between a coupled driving wheel 3 comprising a hollow tire for enlarging and reducing the outside diameter dimension of the coupled driving wheel and a driving wheel 4 comprising a perforated solid tire.

The perforated solid tire is provided with engaging holes 4a for transmitting driving force from the drive by engaging with guide protrusions 2a of the rubber crawler 2. Side holes 4b are formed on each side surface of the driving tire 4 to keep the cushion property of the tire.

The drive is so constructed as to transmit the driving force from an axle S to the rubber crawler 2 by using a method for transmitting driving force through friction between the driving tire 4 and the inside circumference of the rubber crawler 2, together with a method for transmitting driving force through engagement of the guide protrusions 2a and the engaging holes 4a.

In the drawings, H is a wheel for fitting the tire on the axle S; V and N are a bolt and a nut for fitting the wheel to the axle, respectively; and B is a bead wire.

Figure 3:
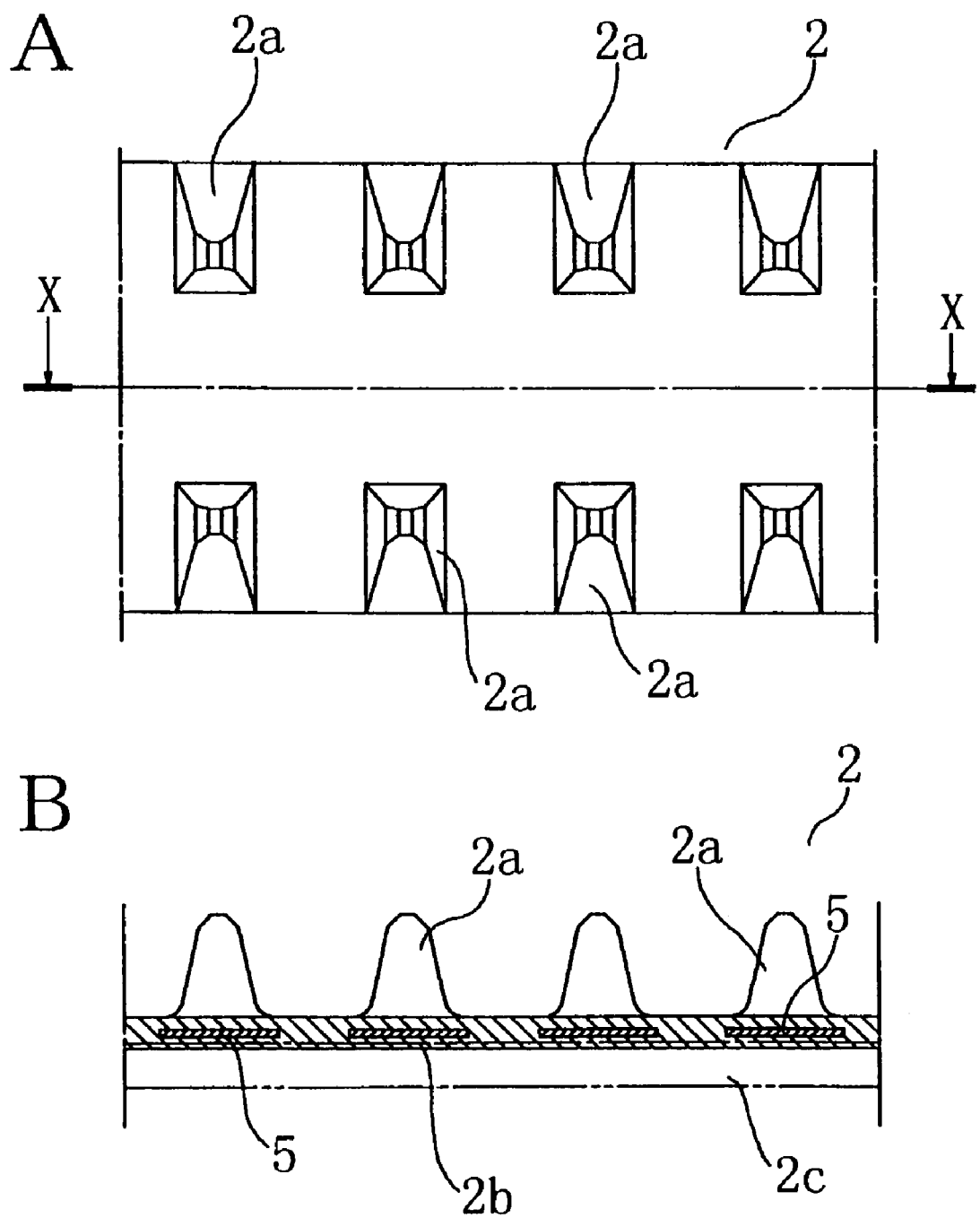
FIG. 3A is a plan view of the inside circumference (opposite the tread) of a rubber crawler.
FIG. 3B is a section view taken along the line X—X of FIG. 3A.

FIGS. 3A and 3B show the rubber crawler 2 of the first embodiment, wherein FIG. 3A is a plan view of the inside circumference of the rubber crawler, and FIG. 3B is a section view taken along the line X—X of FIG. 3A.

The rubber crawler 2 has a tensile strength layer 2b embedded in an endless belt made of a rubber elastic body, the tensile strength layer extending in the circumferential direction. The tensile strength layer 2b is so formed as to comprise a plurality of parallel steel cords arranged in a row in a cross direction of the rubber crawler. Furthermore, flat core members 5 made of vinyl chloride resin of thermoplastic resin are embedded in the inside circumference of the tensile strength layer 2b at a fixed interval to reinforce the rigidity of the rubber crawler. The guide protrusions 2a are protrusively formed on the inside circumference of the rubber crawler 2 at a fixed interval.

Figure 4:
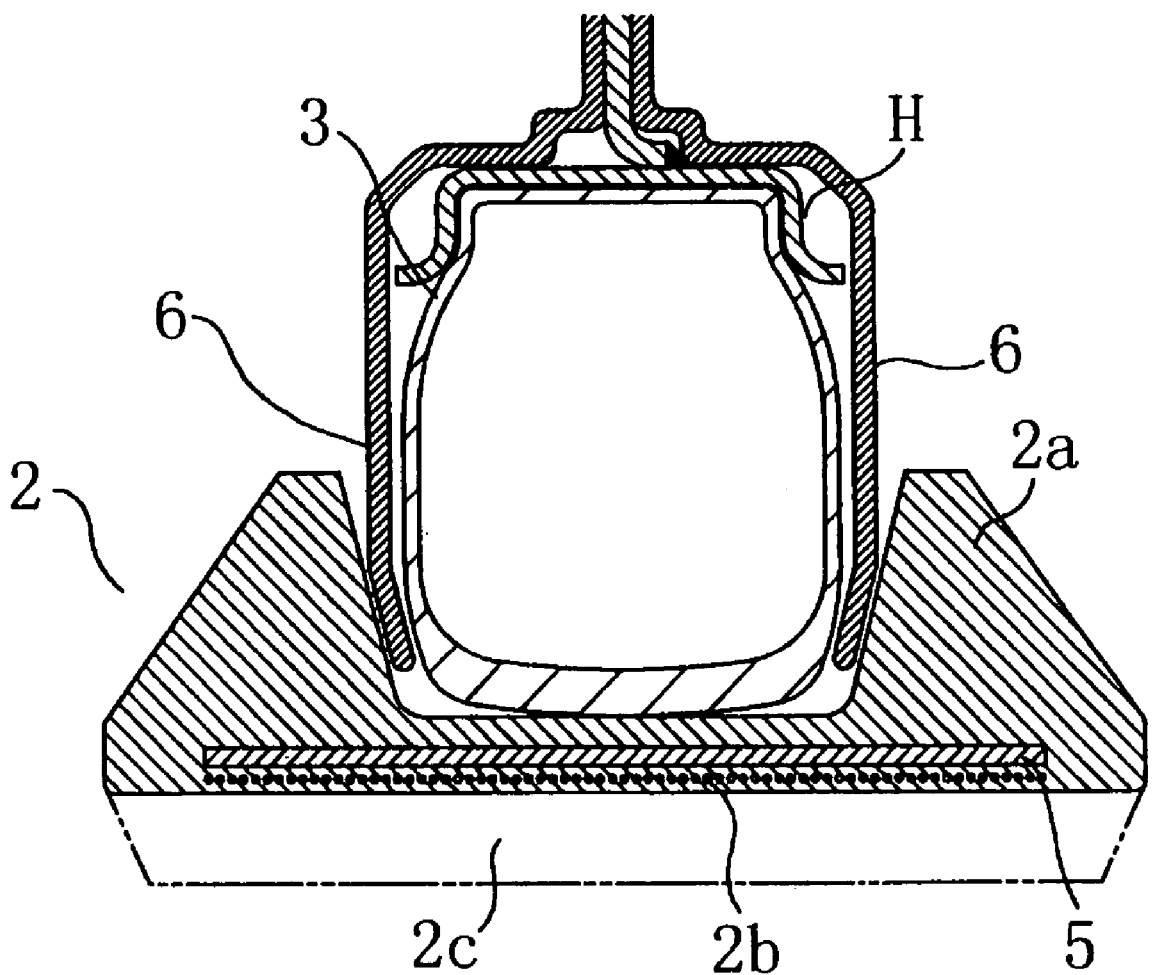
FIG. 4 is a section view in a cross direction showing the relation between a rubber crawler and a tire of a coupled driving wheel, wherein the tire is hollow for enlarging and reducing the outside diameter.

FIG. 4 shows a section view of the hollow tire 3 for enlarging and reducing the outside diameter dimension, and sideboards 6 are provided on both side surfaces thereof. According to this, the tire can be prevented from damage caused by direct contact between the guide protrusions 2a and the side surfaces thereof. Besides, the sideboards 6 prevent the crawler from coming off by the tire running on the guide protrusions of the tire when the rubber crawler 2 laterally shifts.

In this embodiment, the sideboards 6 are fitted on the side of the wheel H and the axle S so as to be attached and detached individually. Besides, a sideboard may be formed so as to apply plastic on the side surface of the tire directly.

In FIGS. 1 to 4, 2c is a rubber lug provided on the tread of the rubber crawler, and its shape is not illustrated clearly. The shape of the rubber lug is suitably selected in accordance with the place and the purpose for which the rubber crawler is used. For example, a parallel pattern, a staggered pattern, a continuous pattern and a triangular pattern of rubber lugs have all been used successfully for a long time.

Figure 5:
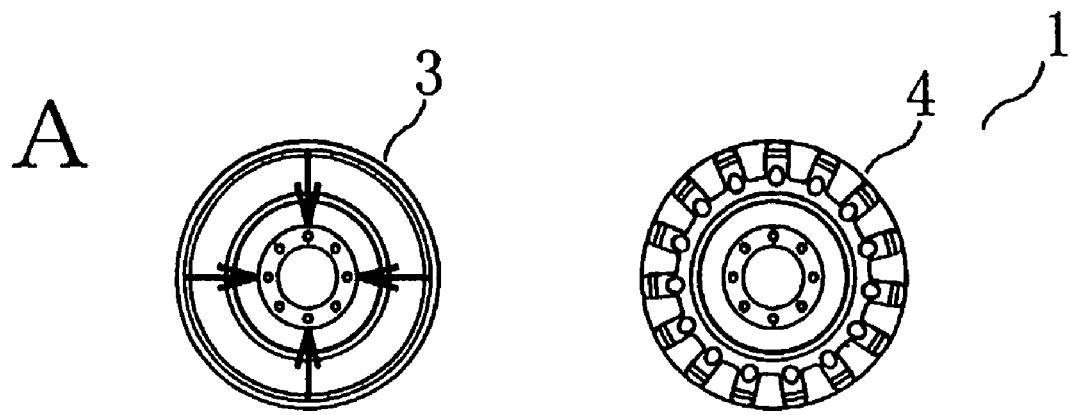
FIGS. 5A–5C are side views for explaining a method by which a rubber crawler is installed on tires of a drive.
Figure 5:
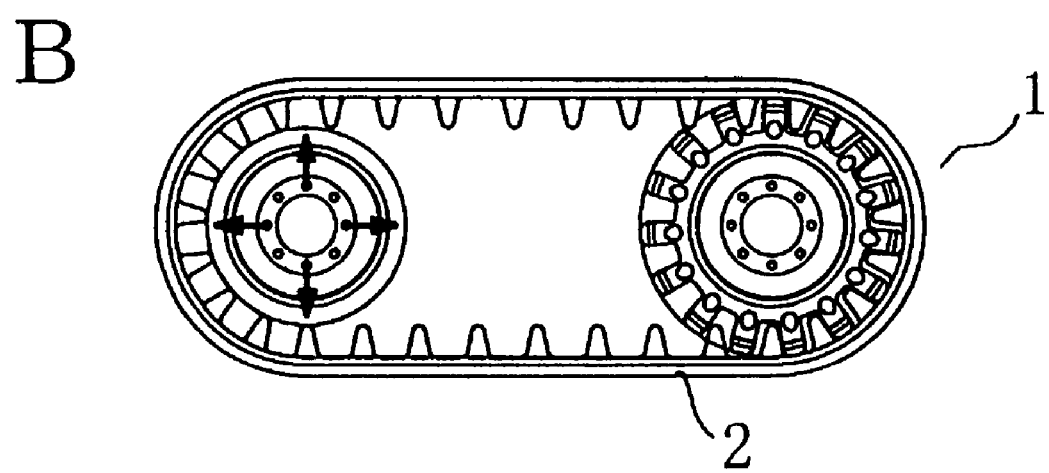
Figure 5:
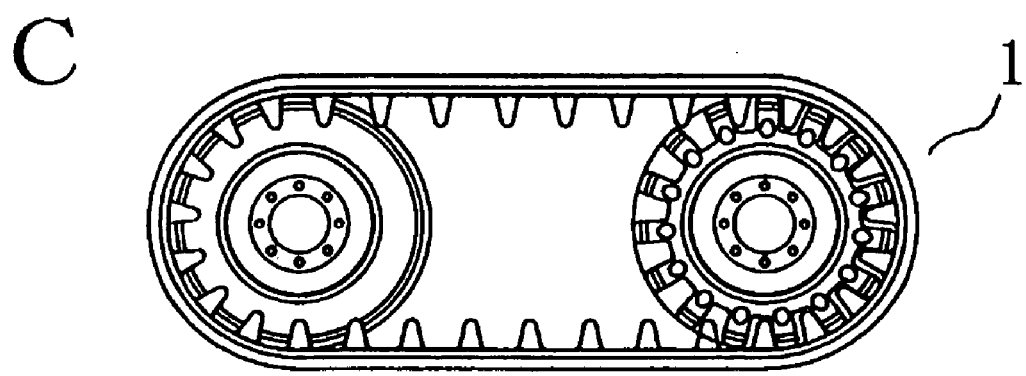

A method by which the rubber crawler 2 of the first embodiment is installed on the tires 3, 4 of the drive 1 is explained with reference to FIG. 5 as follows.

First of all, air is ejected from the hollow tire 3 to reduce the outside diameter dimension (FIG. 5A).

The rubber crawler 2 is suspended on the tire 3 (FIG. 5B).

Then, air is fed into the hollow tire 3 again to enlarge the outside diameter dimension, and the crawler is installed on the drive (FIG. 5C).

In this case, when the crawler loosens, the extension thereof is adjusted by further injecting air into the hollow tire 3.

Figure 6:
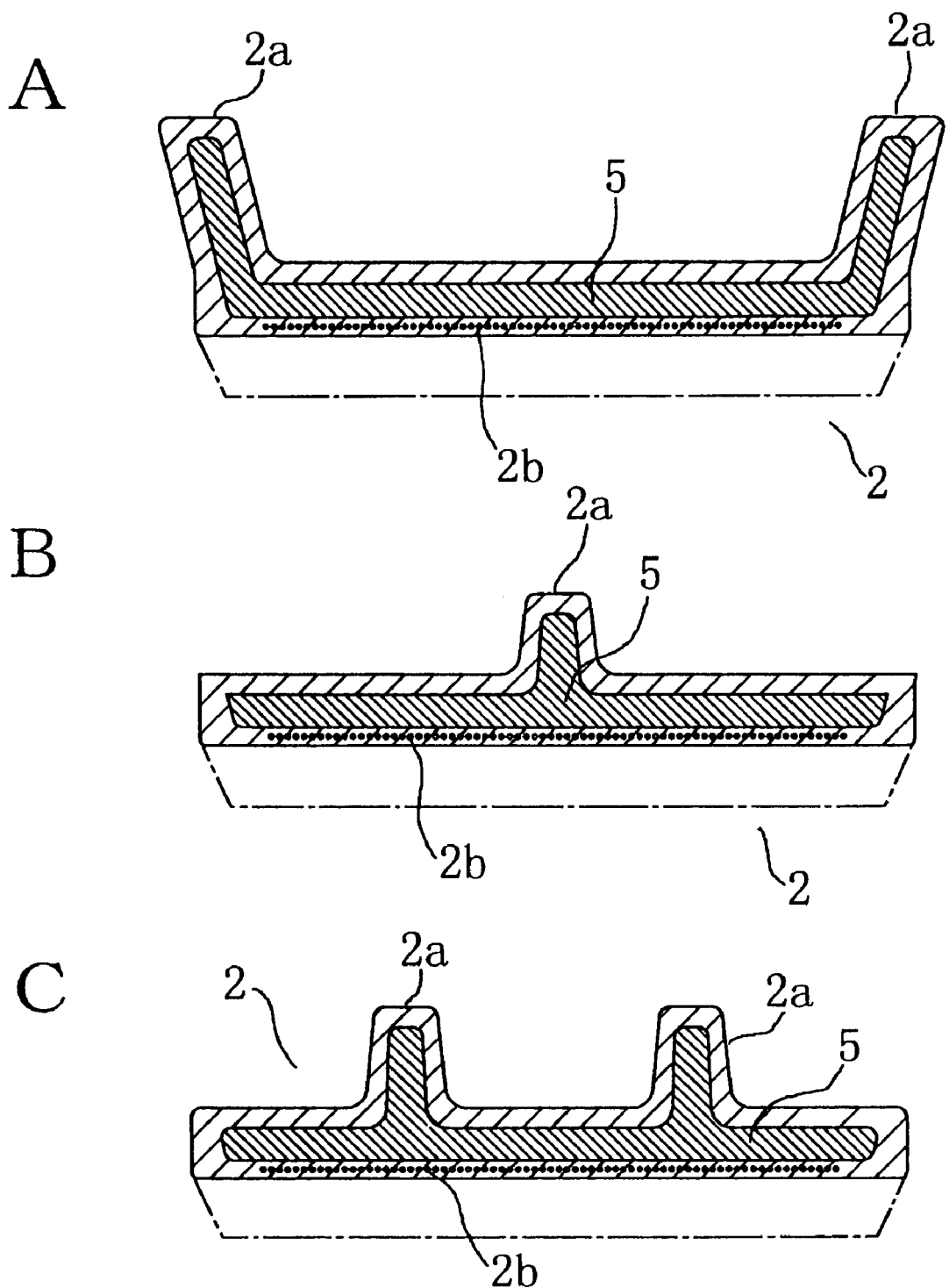
FIGS. 6A–6C are section views in a cross direction showing different embodiments of the shapes of guide protrusions of a rubber crawler.

FIGS. 6A–6C respectively show different embodiments of the shapes of a rubber crawler 2 with guide protrusions 2a.

FIG. 6A is a section view of an embodiment wherein a core member 5 is embedded inside the guide protrusions 2a. FIG. 6B is a section view of an embodiment wherein the guide protrusion 2a is provided at the center. FIG. 6C is a section view of an embodiment wherein the guide protrusions 2a are provided nearer to the center than both ends in the cross direction of the rubber crawler.

Figure 7:
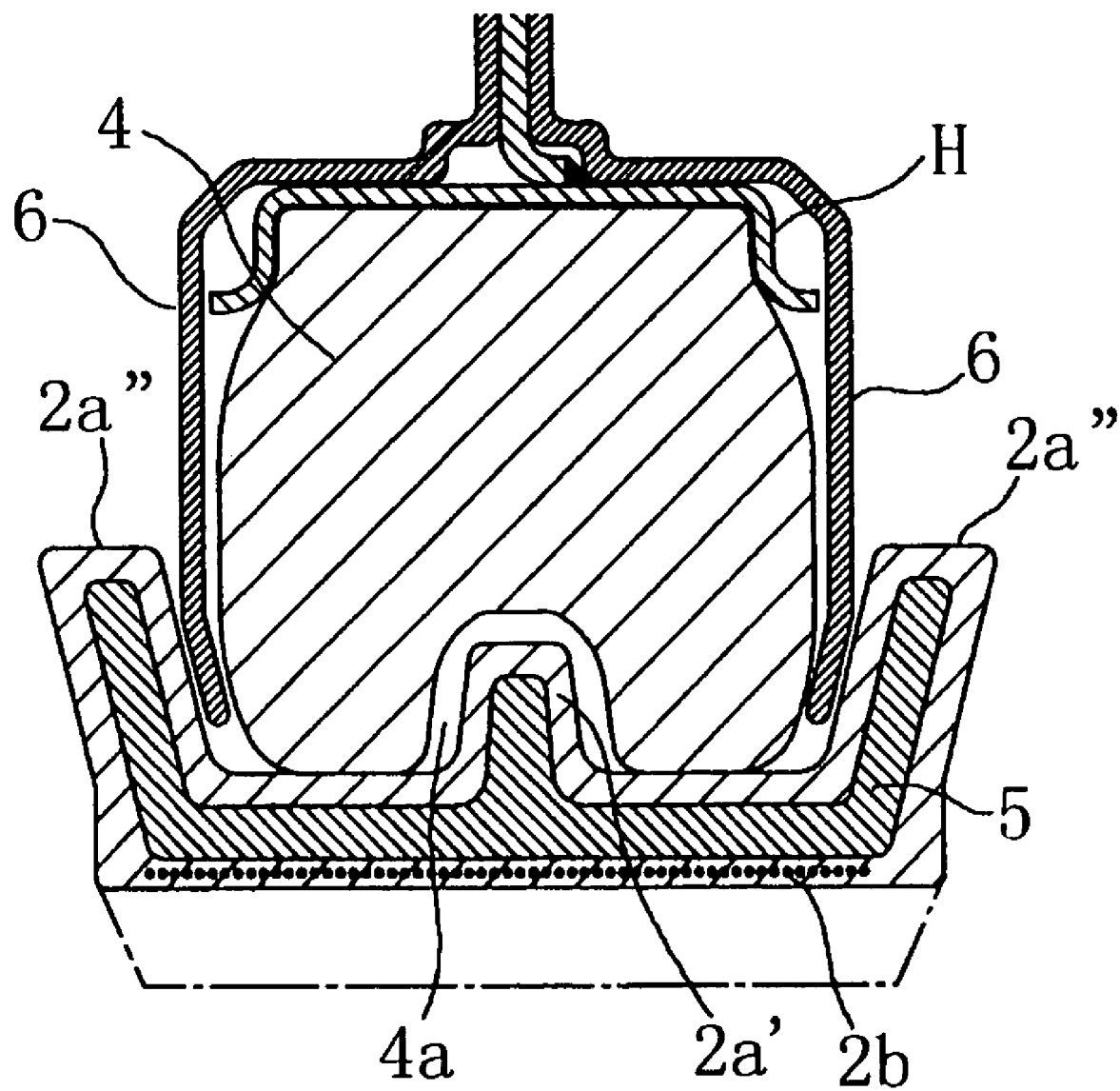
FIG. 7 is a section view in a cross direction showing the driving transfer relationship between a rubber crawler and a solid tire of a driving wheel.

FIG. 7 is a section view showing an embodiment wherein a guide protrusion 2a' is provided at the center of the crawler and guide protrusions 2a'' are provided at both ends in the cross direction thereof. In this embodiment, the guide protrusions 2a'' act so as to prevent the rubber crawler from coming off, and the guide protrusion 2a' is used to transmit the driving force to the rubber crawler 2. That is, the guide protrusion 2a' is engaged with the engaging hole 4a provided at the center of the solid tire 4 of the driving wheel to transmit the driving force to the crawler.

The rubber crawler of this embodiment may be used with a double tire with two tires on the axle, wherein the tires are arranged between the guide protrusions thereof.

Figure 8:
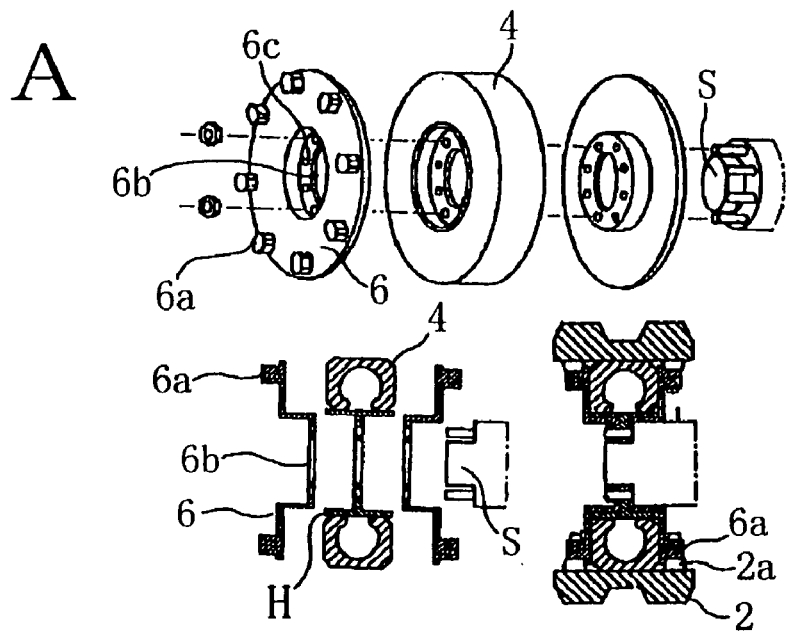
FIGS. 8A–8C are views showing different embodiments of a method for driving crawlers.
Figure 8:
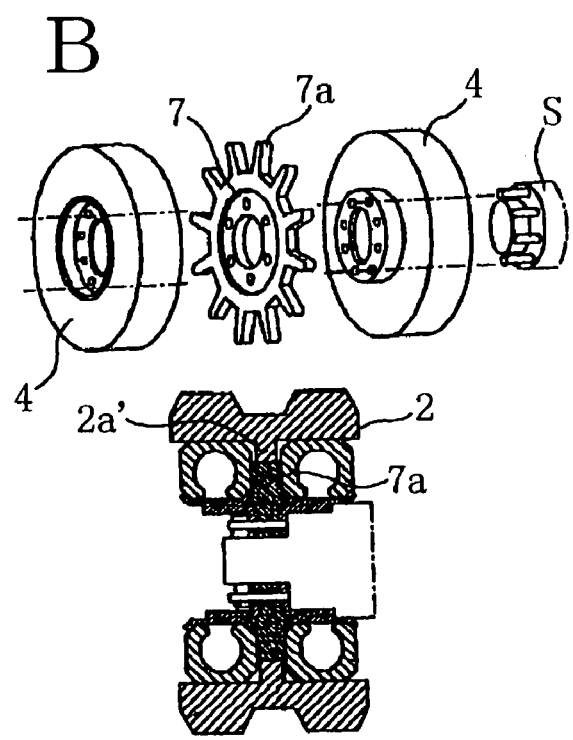
Figure 8:
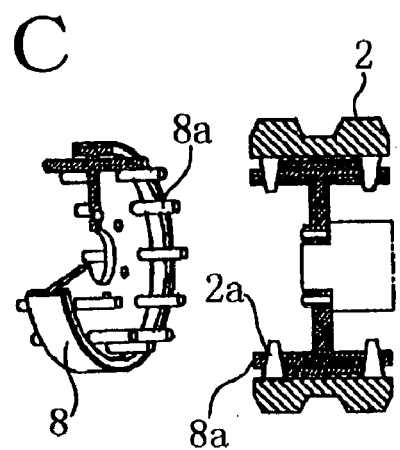

FIGS. 8A–8C respectively show different embodiments of a method for transmitting driving force to a crawler.

FIG. 8A are an exploded perspective view, an exploded section view and a section view, each showing an arrangement in which sideboards 6 are fitted on a tire 4 and an axle S. In this embodiment, driving protrusions 6a are arranged on the fringe of one side of a disk main body of a sideboard 6 at a fixed interval. An inner hole 6b and bolt holes 6c, each for fitting protruding parts of the axle S, are provided at the center of the sideboard 6. The sideboard 6 has a concave shape, as shown in the figures, so as to be closely inserted in the wheel H of the tire 4, wherein the circumference of the bolt holes 6c and the inner hole 6b becomes hollow. The sideboards 6 are provided on both sides of the tire 4, as shown in the figures. The protruding part of the axle S is inserted into the inner holes of the sideboards 6 and their intermediate tire 4, and axle bolts are inserted in the bolt holes 6c to be fixedly tightened with nuts.

FIG. 8B show another embodiment, by means of an exploded perspective view and a section view showing an arrangement in which a driving gear 7 is fitted on the tires 4 and the axle S. In this embodiment, engaging teeth 7a of the driving gear 7 are engaged with central guide protrusions 2a' of the rubber crawler to transmit the driving force to the crawler. In addition, this embodiment adopts a double tire, so that the driving gear 7 may be provided between two tires.

FIG. 8C show further another embodiment of the driving form of the present invention, which are a perspective view with parts partially broken away of the rubber crawler and a view showing its fitting state. As shown in the figures, a driving steel wheel (tire) 8 of this embodiment is so constructed that driving protrusions 8a protrude on the fringes of both surfaces of the metallic disk main body at a fixed interval. The driving force is transmitted by engagement of the protrusions and the guide protrusions 2a of the rubber crawler.

Figure 9:
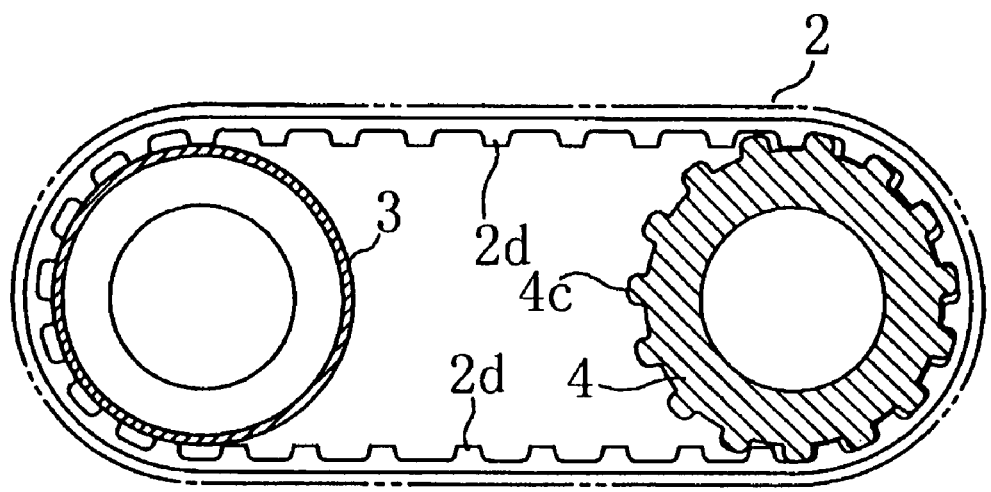
FIGS. 9A and 9B are views showing different embodiments of a method for driving crawlers.
Figure 9:
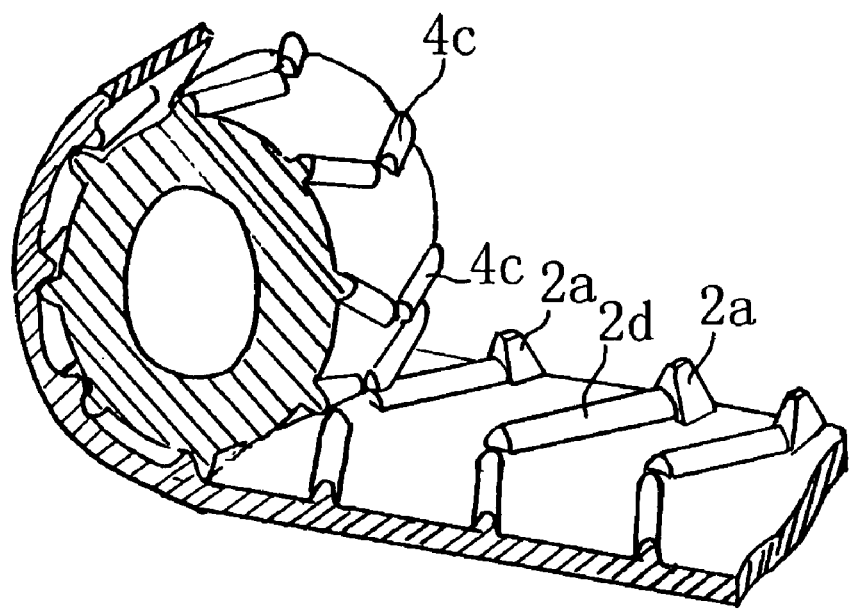

FIGS. 9A and 9B respectively show different embodiments of a method for transmitting driving force of the drive of the present invention.

FIG. 9A is a side view for explaining the state in which the rubber crawler 2 is suspendedly installed on the hollow tire 3 of a coupled driving wheel and the solid tire 4 of a driving tire.

In this embodiment, the driving tire 4 is provided with driving protrusions 4c on the outside circumference thereof to be made in a gear shape. The rubber crawler 2 is similarly provided with small driving protrusions 2d between the guide protrusions 2a, 2a of the inside circumference thereof to be made irregular. The driving force is transmitted in a timing belt method wherein the driving protrusions 4c are engaged with the small driving protrusions 2d.

Besides, as shown in FIG. 9B, the driving protrusions 4c and the small driving protrusions 2d may be formed in a V shape.

Figure 10:
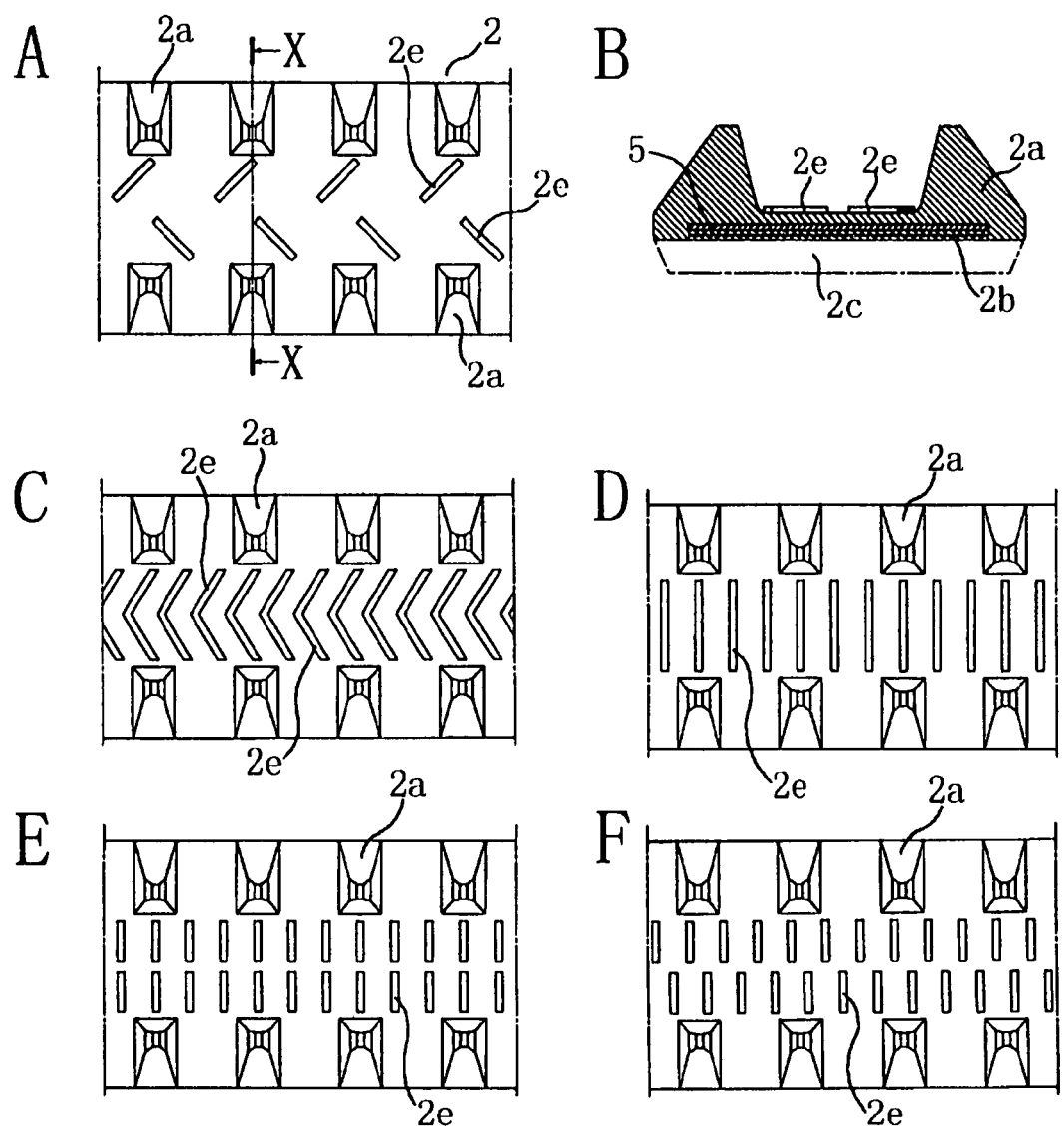
FIGS. 10A–10F are plan views showing different embodiments of the inside circumferences of rubber crawlers having small protrusions.

FIGS. 10A–10F respectively show different embodiments in which small protrusions 2e are provided on the inside circumference of the rubber crawler. FIG. 10A is a plan view of the inside circumference of the rubber crawler, and FIG. 10B is a section view taken along the line X—X of FIG. 10A.

On the inside circumference of the rubber crawler 2 of this embodiment, the small protrusions 2e, each in a V shape, are provided so as to be on the right and left of center in the cross direction and are staggered. In this case, driving force due to the friction between the driving tire and the inside circumference of the rubber crawler can be effectively transmitted.

FIGS. 10C–10F are plan views of the inside circumference of rubber crawlers showing different arrangements of the small protrusions 2e, respectively. In FIG. 10C, the small protrusions 2e are arranged in a 'V' shape. In FIG. 10D, linear small protrusions are arranged parallel in the cross direction of the rubber crawler. In FIG. 10E, the small protrusions 2e of FIG. 10D are divided to be on the right and left of center, in the cross direction, of the rubber crawler. In FIG. 10F, the small protrusions 2e to the right of center in FIG. 10E are staggered with respect to the small protrusions 2e to the left of center.

Figure 11:
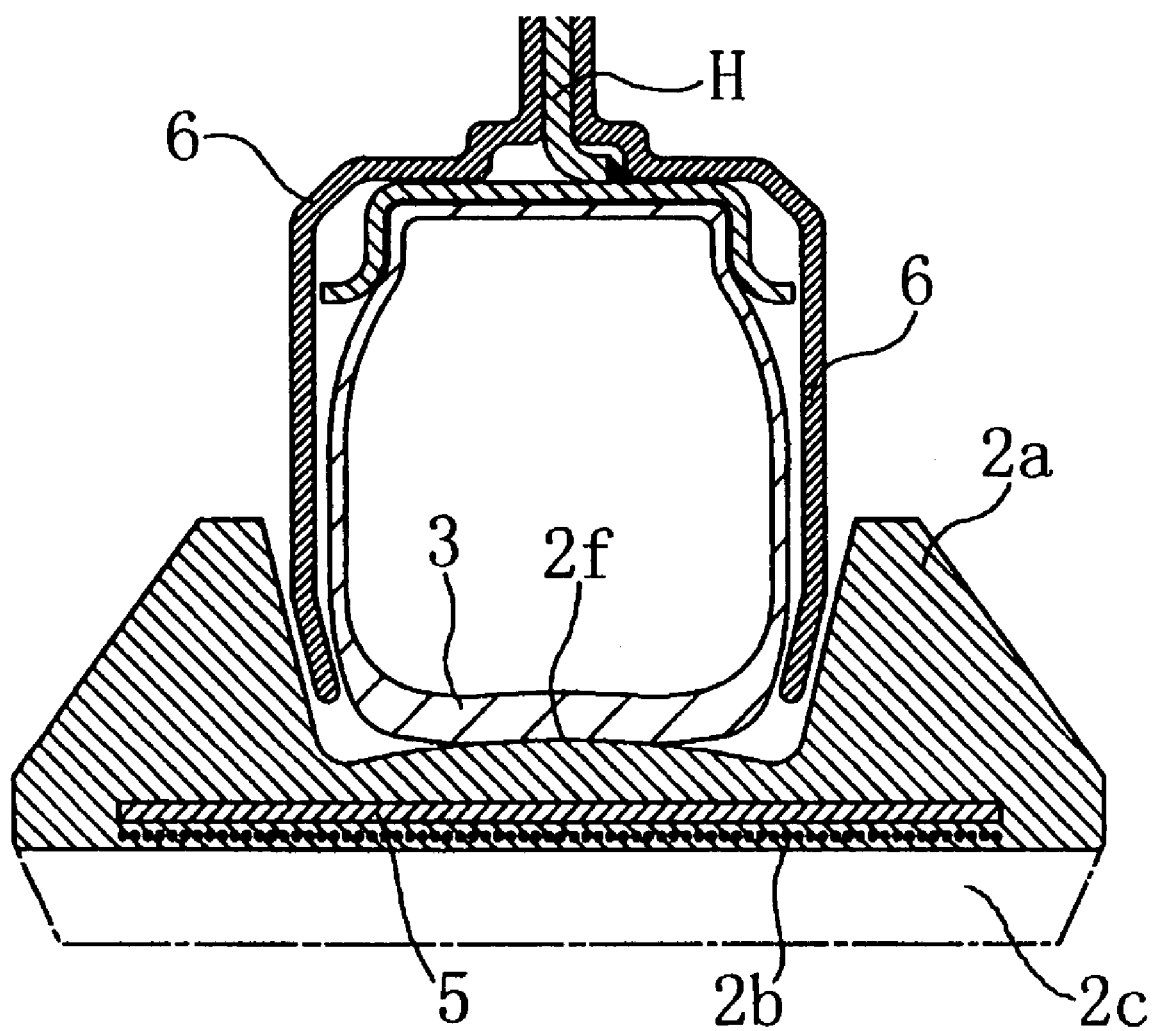
FIG. 11 is a section view in a cross direction showing an embodiment wherein the inside circumference of a rubber crawler has a high center part and low edges.

FIG. 11 is a section view in the cross direction of an embodiment wherein the inside circumference of the rubber crawler is formed in a gentle curved shape partially with different tension.

According to this embodiment, mud is effectively ejected. When the rubber crawler shifts from the center of the tire to either side thereof, the center of the rubber crawler is automatically moved back to the center of the tire by the difference of tension so as to prevent it from coming off of the tire.

In cases in which small protrusions are provided on the inside circumference of the rubber crawler, the protrusions are made high at the center and gradually lower towards the edges.

FIGS. 12A–12C show different embodiments in which the core members 5 are embedded in the inside circumference of the rubber crawler, wherein a part of each core member 5 is exposed. FIG. 12A is a plan view of the inside circumference of the rubber crawler; FIG. 12B is a section view taken along the line X—X of FIG. 12A; and FIG. 12C is a section view taken along the line Y—Y thereof.

Figure 12:
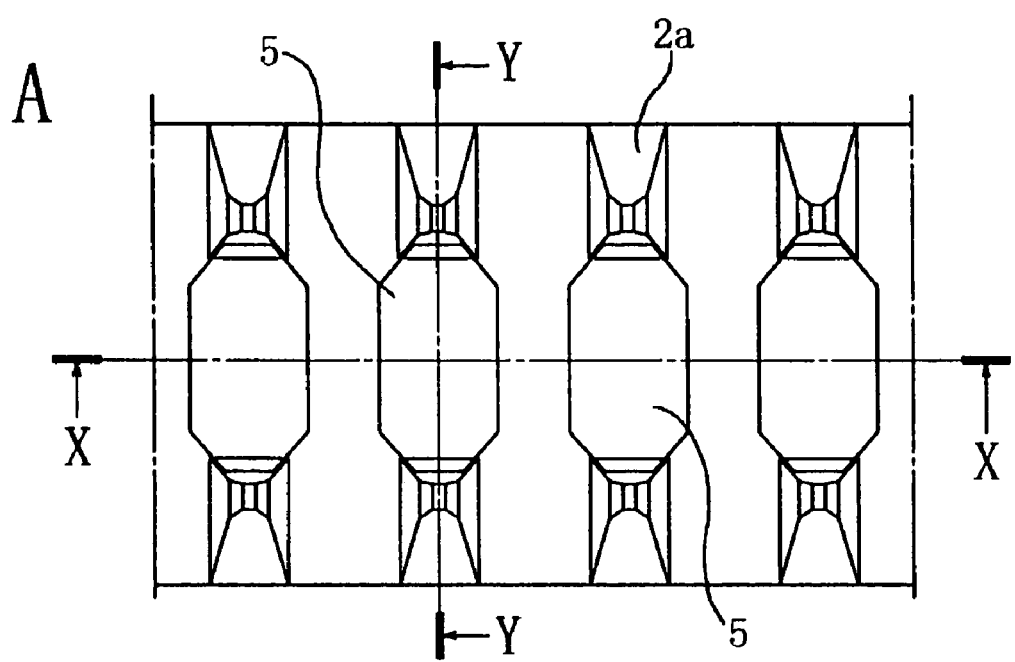
FIG. 12A is a plan view of the inside circumference of a rubber crawler showing an embodiment wherein core members are embedded in the inside circumference of the rubber crawler so that a part of them may protrude.
FIG. 12B is a section view taken along the line X—X of FIG. 12A.
FIG. 12C is a section view taken along the line Y—Y of FIG. 12A.
Figure 12:
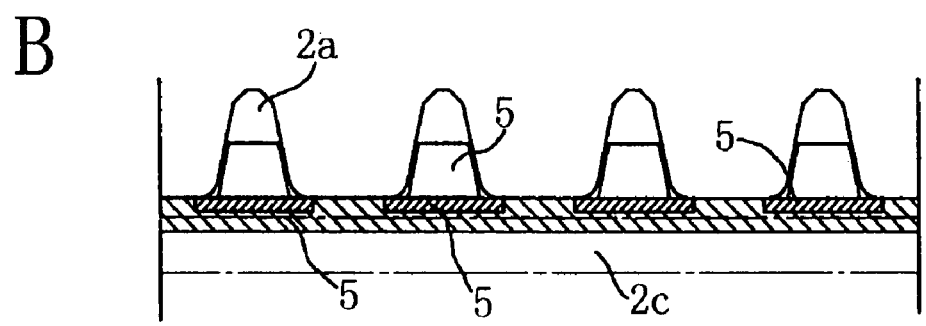
Figure 12:
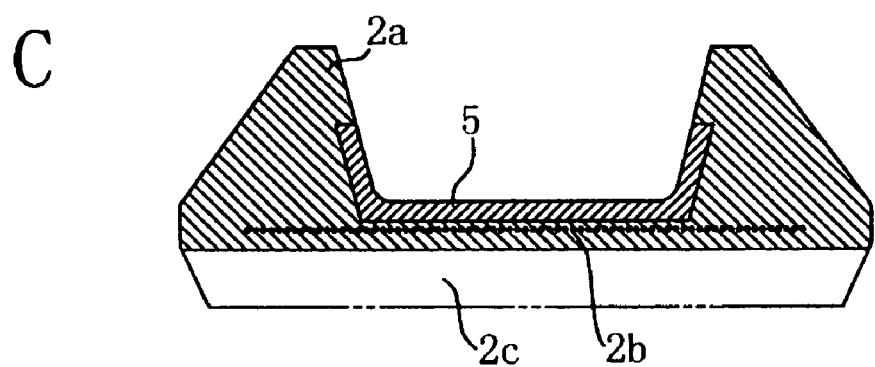

When the core members 5 are embedded in the rubber crawler so as to be exposed and to form the same plane as the inside circumference of the rubber crawler as shown in FIG. 12, the inside circumference of the rubber crawler is prevented from wearing due to friction with the tire.

When the core members 5 are embedded so as to be exposed only protrusively from the inside circumference of the rubber crawler, they can take the place of the small protrusions 2e.

Figure 13:
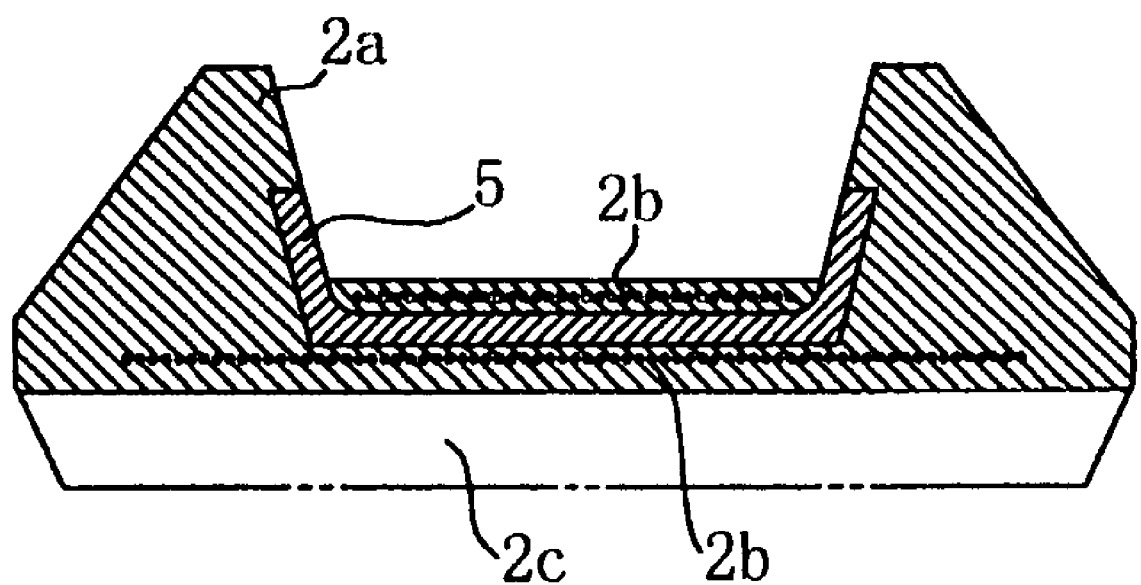
FIG. 13 is a section view in a cross direction showing another embodiment of a rubber crawler wherein core members are embedded in the inside circumference of a rubber crawler.

Besides, as shown in FIG. 13, the core members 5 may be embedded so as to be exposed in only part of the guide protrusions 2a.

Figure 14:
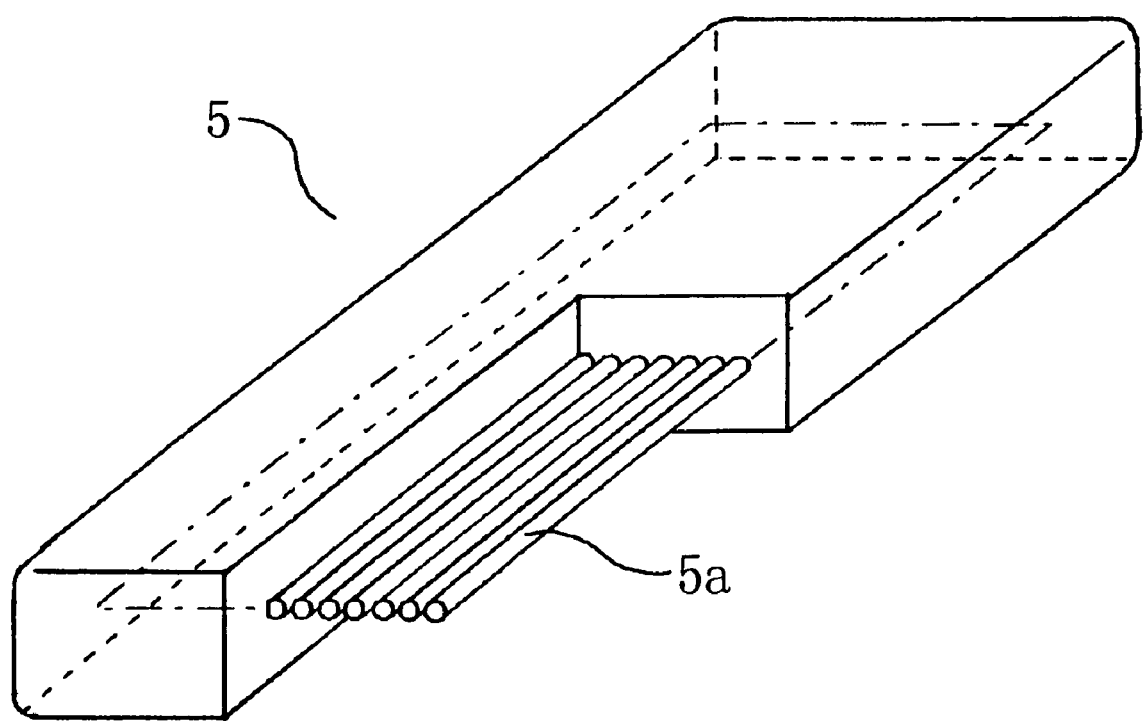
FIG. 14 is a perspective view, with parts partially broken away, showing another embodiment of a core member to be embedded in a rubber crawler.

FIG. 14 is a perspective view, with parts broken away, showing another embodiment of the core members 5 to be embedded in the rubber crawler.

A strength layer 5a made of steel cords is embedded in the core member 5 as a strength member in this embodiment. The strength layer 5a is so formed that a plurality of steel cords are arranged in a row and are parallel along the longitudinal direction of the core member horizontally.

Although the core member 5 in FIG. 14 is an example of a single strength layer 5a, a plurality of strength layers 5a may be embedded. In this case, the strength members may be biased to the longitudinal direction of the core member. In case of a plurality of layers, each layer may be different in the quality of the material and the array direction.

Figure 15:
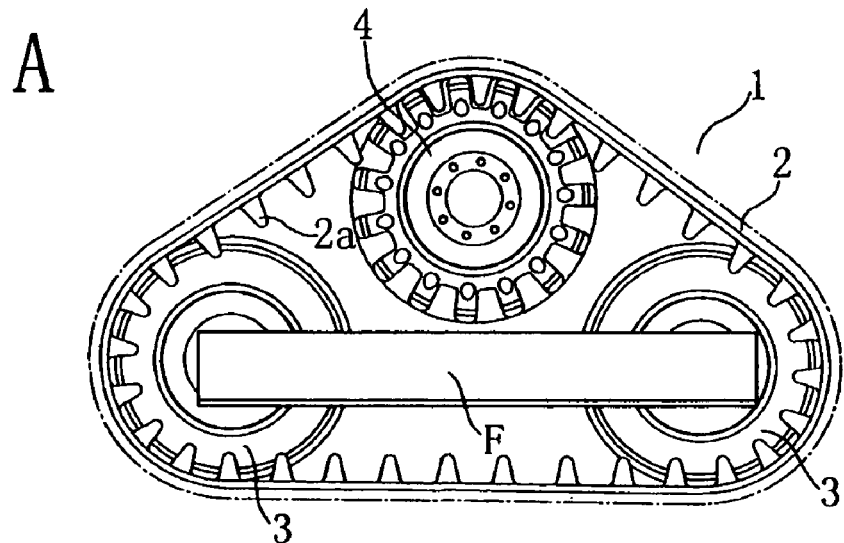
FIGS. 15A–15C are side views showing different embodiments of crawler drives with a rubber crawler of the present invention.
Figure 15:
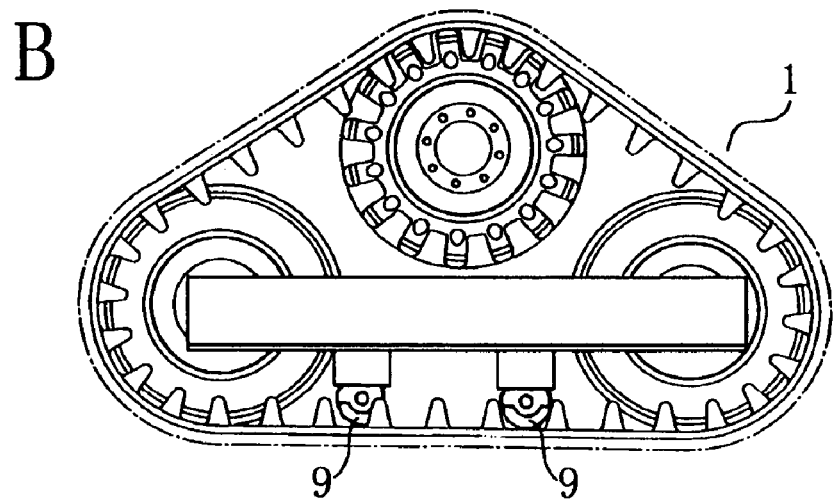
Figure 15:
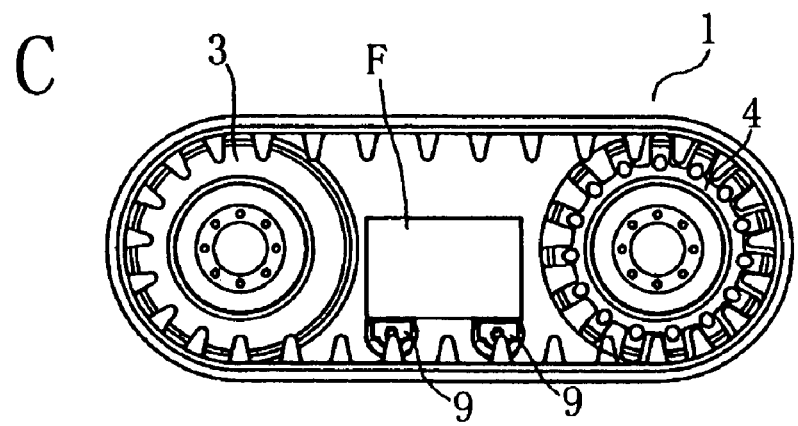

FIGS. 15A–15C are respective side views showing different embodiments regarding a crawler drive with the rubber crawler of the present invention.

In the crawler drive 1 of this embodiment, the driving wheel 4 is arranged above, and the coupled driving wheels 3, 3 are arranged at the ends of the tread. As shown in FIG. 15B, carrying wheels 9 may be arranged between the coupled driving wheels 3, 3. Besides, as shown in FIG. 15C, the carrying wheels 9 may be arranged between the coupled driving wheel 3 and the driving wheel 4 of the crawler drive in the first embodiment.

Besides, the crawler drive for installing the rubber crawler 2 of the present invention may be provided with a conventional crawler extension adjusting system (for example, which moves a coupled driving wheel in a longitudinal driving direction of rubber crawler due to the injection of grease) on its frame F.

Figure 16:
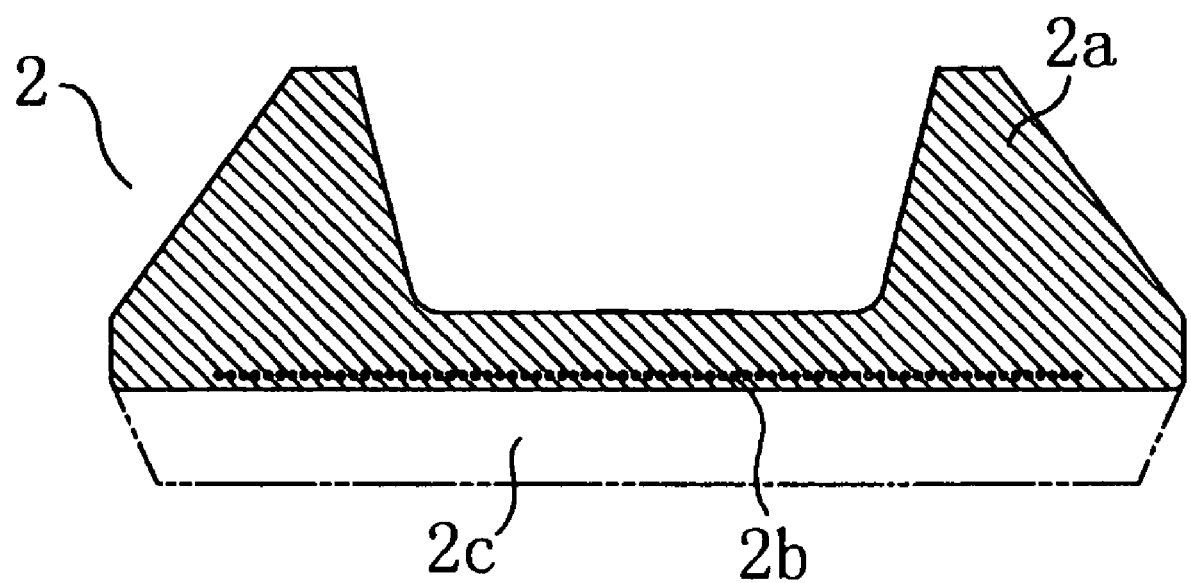
FIG. 16 is a section view in a cross section of an embodiment wherein core members are embedded in a rubber crawler.

FIG. 16 is a section view in a cross direction of a rubber crawler showing an embodiment wherein no core members or metallic core members are embedded therein.

Although it is preferable that the core members are embedded in the rubber crawler to be used in the present invention, like this embodiment, they are not necessarily needed. Besides, in addition to this embodiment, core members made of a high hardness rubber or a metal such as iron can be also used.

Figure 17:
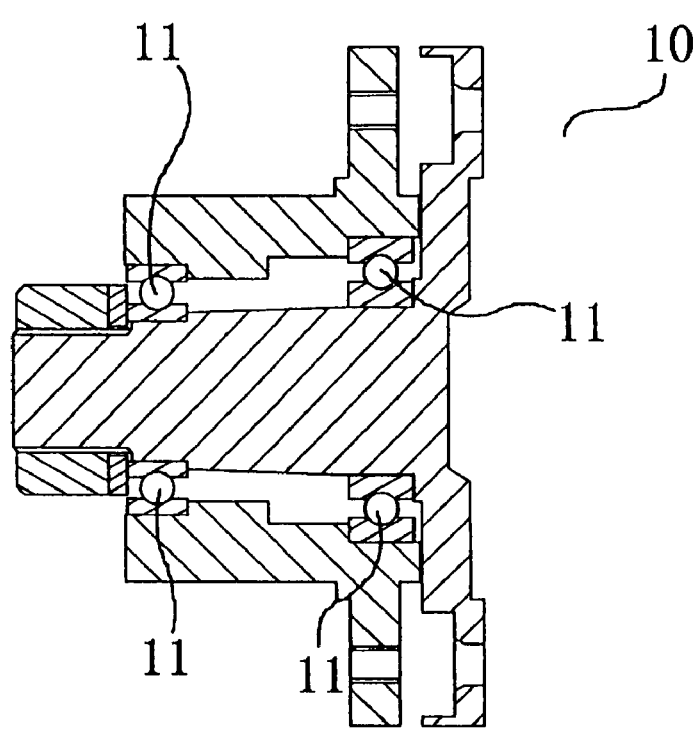
FIG. 17A is a cross section of a bearing device that is installed and used between an axle and a wheel of a crawler drive.
FIG. 17B is a front view thereof.
Figure 17:
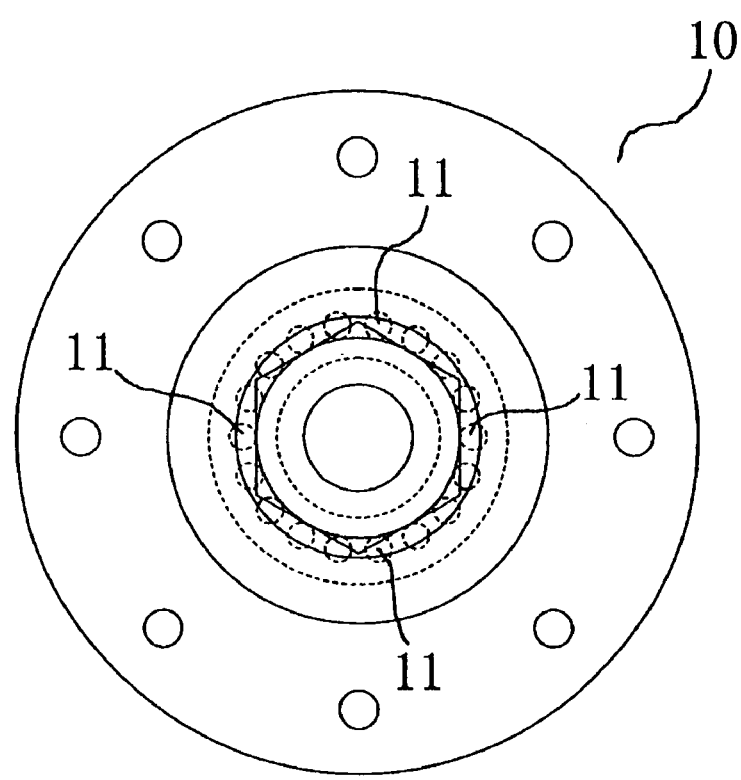

FIGS. 17A and 17B show a bearing device 10 to be fitted and used between the axle S and the wheel H of the crawler drive, wherein FIG. 17A is a cross section and FIG. 17B is a front view.

Figure 19:
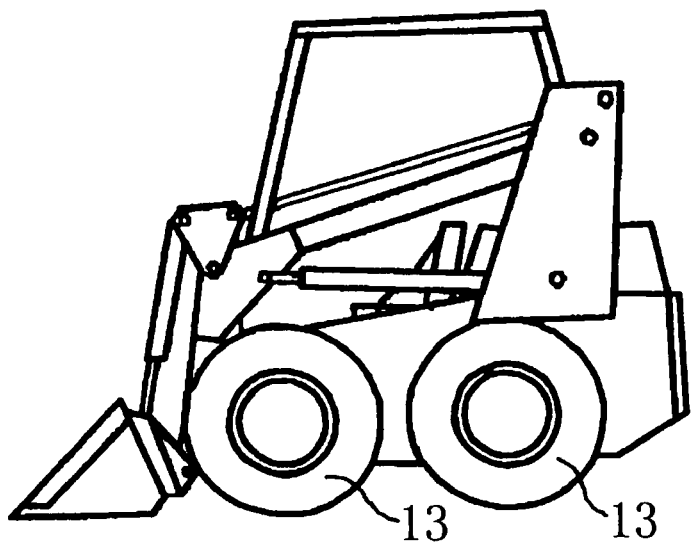
FIG. 19A is a side view of a conventional skid steering loader having tires.
FIG. 19B is a perspective view thereof.
FIG. 19C is a side view of a conventional multiwheeled vehicle.
Figure 19:
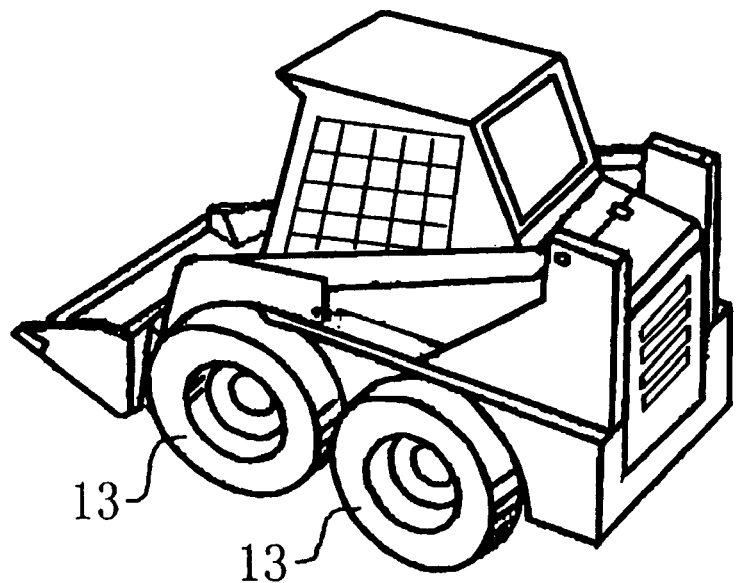
Figure 19:
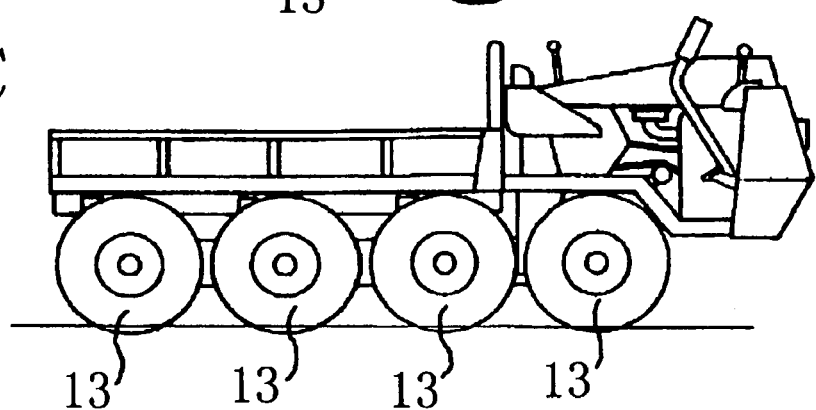
Figure 20:
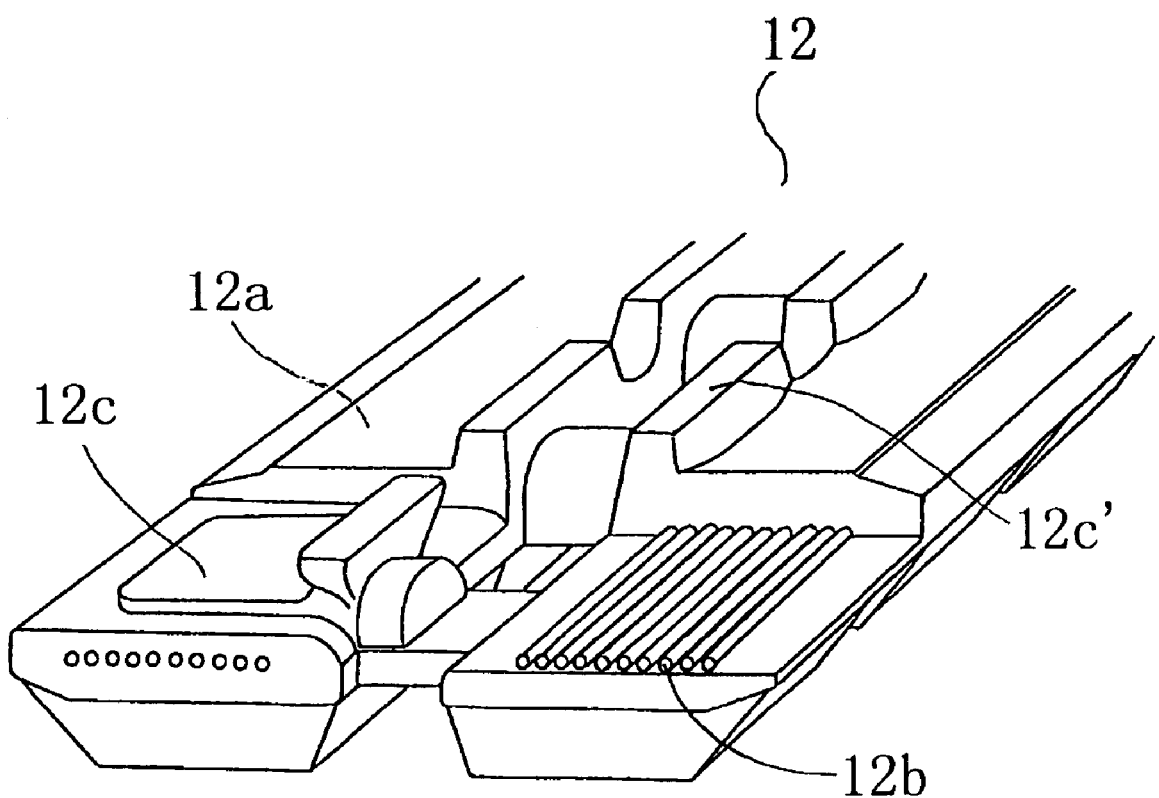
FIG. 20 is a perspective view, with parts partially broken away, of a conventional rubber crawler.
Figure 21:
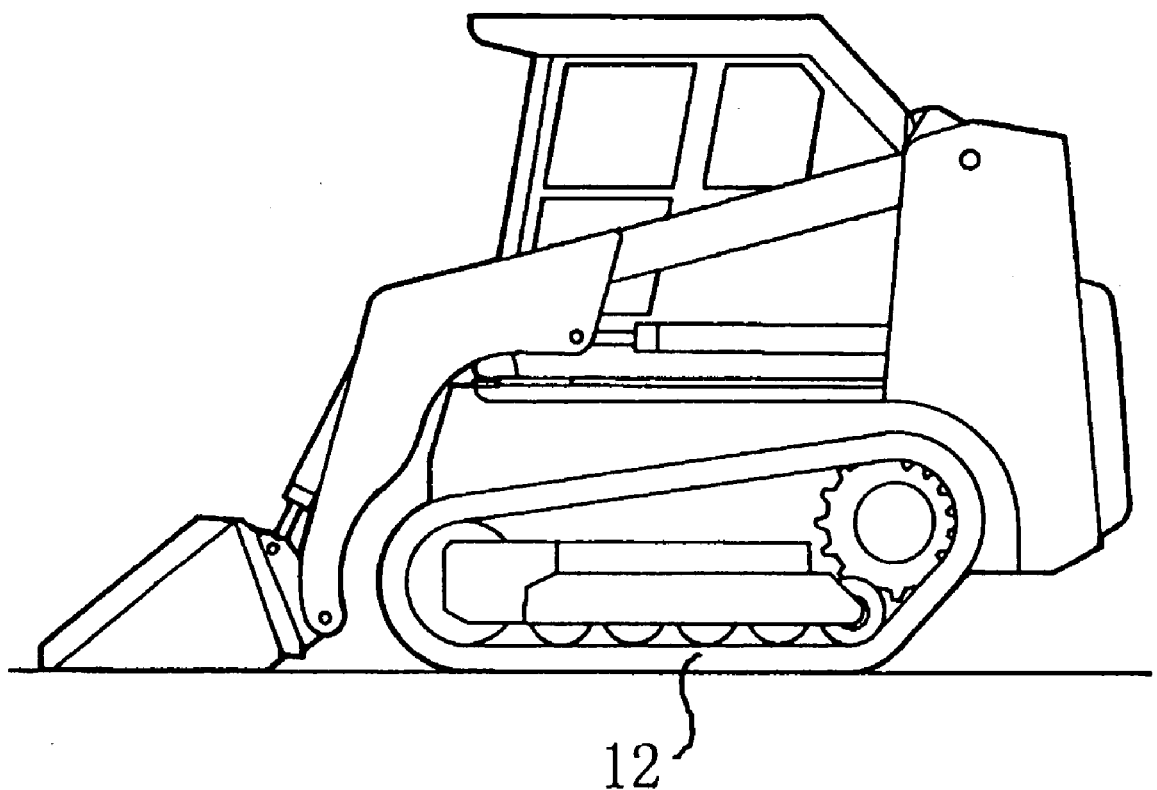
FIG. 21 is a side view of a conventional skid steering loader having a crawler drive.
Figure 22:
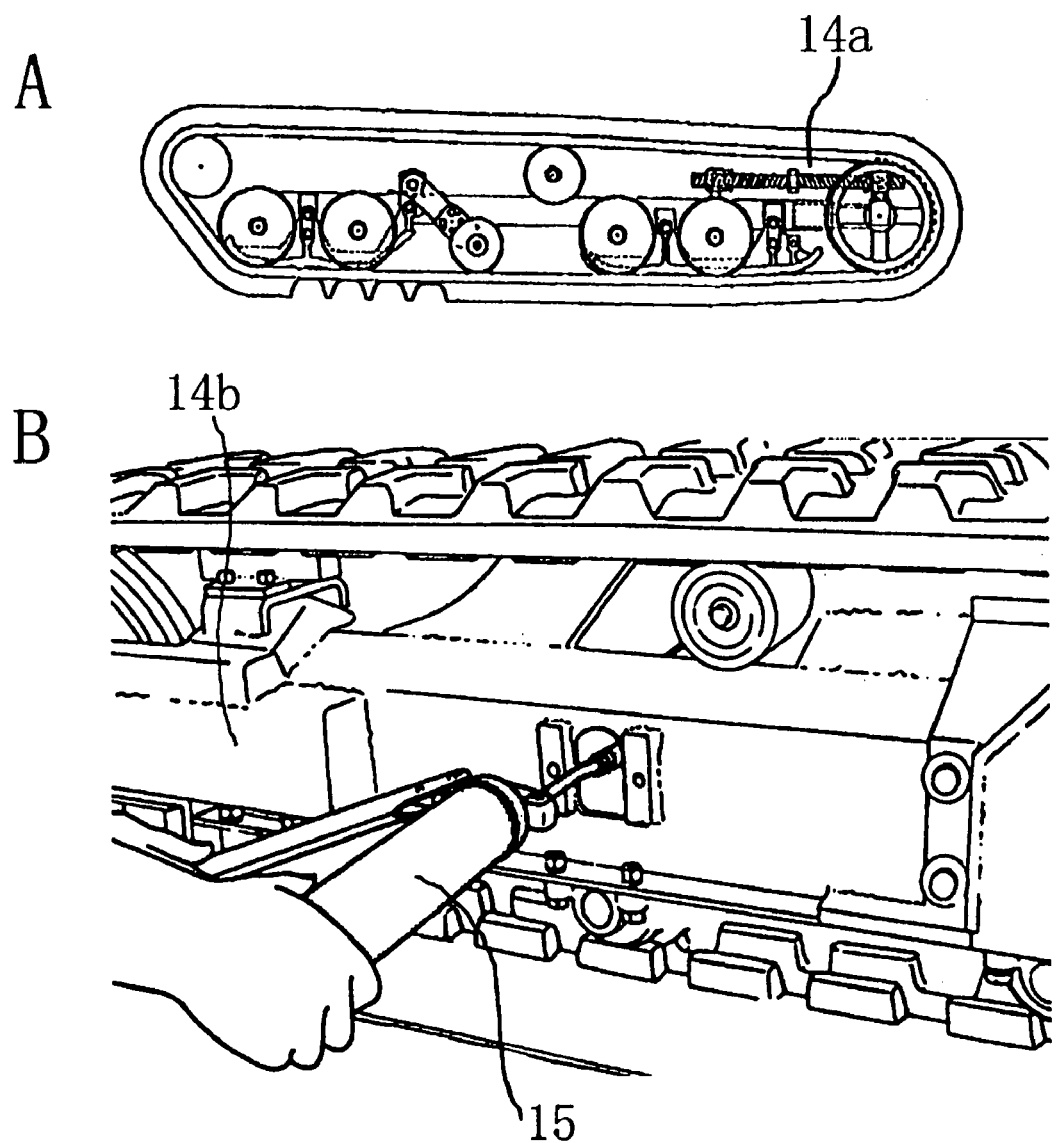
FIG. 22A is a side view of a crawler drive with a conventional screw device for adjusting crawler extension.
FIG. 22B is an explanatory view showing an injection part for grease in a crawler drive with a grease device for adjusting crawler extension.

Some conventional skid steering drives (see FIG. 19) are formed in all wheel drive. And therein, the axles S of each drive provided on the right and left of the vehicle are connected through a chain for transmitting driving force from an engine to the axles S to rotate synchronously.

When the rubber crawler is suspendedly installed on the drive whose front and rear axles S synchronously rotate, there is no problem if the outside diameter dimensions of the front and rear tires of the drive are the same. However, if the outside diameter dimensions are different, the peripheral speeds of these tires are different. As the result, the winding speeds are different in the front tires and the rear tires on which the rubber crawler is wound, thereby loading either the rubber crawler, the driving equipment, or both. Therefore, in the worst case, either the crawler, the driving equipment, or both are damaged.

The bearing device 10 of this embodiment is used to solve such a problem. The mechanism is so formed that the tires (wheels) can freely rotate regardless of the rotations of the axles S, which interrupt transmission of rotations of the bearings 11 in the bearing device 10 to the tires (wheels). Hence, the above-mentioned problem can be solved by the bearing device, thereby enabling the rubber crawler to be suspendedly installed on driving equipment having all wheel drive.

Figure 18:
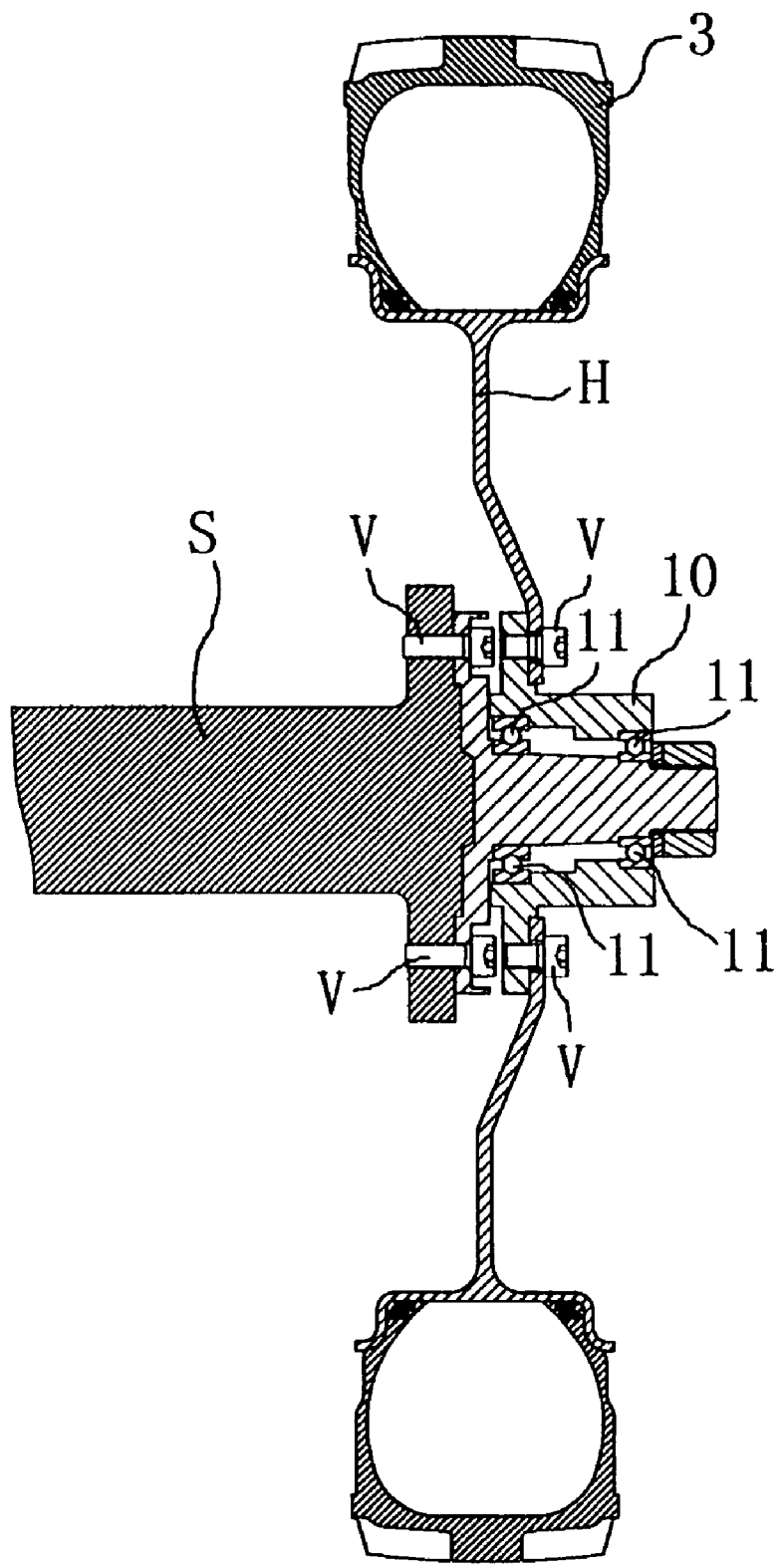
FIG. 18 is a section view of a coupled driving wheel installed on an axle of a crawler drive.

For a reference, in FIG. 18 is shown a section view showing the state in which the coupled driving wheel 3 is fitted on the axle S of the drive.

Since a rubber crawler is so constructed that core members made of an elastic body of thermoplastics, thermosetting plastics, urethane resins, hard rubber with high hardness, or a blend material or a bridging material composed of these plastics and rubber, or a high hardness rubber are embedded at a fixed interval, the total weight of the core members is less than conventional metallic core members, the rubber crawler can be lightened, and the rigidity of the rubber crawler is maintained.

Since the core members are made of plastic material, they can be integrally fused and bound with the rubber elastic material or resin material of an endless belt to form a rubber crawler main body.

Since the inside circumference of the rubber crawler is convexly curved so that the center in the cross direction is high and the ends thereof become gradually lower in a direction from the center, mud drains away well. Therefore, the mud is prevented from gathering between the crawler and the tires, and the crawler is prevented from coming off of the tire. Besides, since abnormal tension is not imposed on the crawler by clogged mud, the crawler is prevented from being severed. When the crawler is shifted relative to the tire, it is moved back to the center by the shape, thereby enabling the crawler to adjust to side shifts and preventing the crawler from coming off.

Drives according to a tire specification comprising more than two tires are arranged to right and left sides of a vehicle, a rubber crawler is suspended on the longitudinal end tires of each drive, and at least one of the tires is a hollow tire for adjustably enlarging and reducing the outside diameter dimension, and therefore, a drive can serve as both a drive according to a tire specification and a drive according to a crawler specification, and manufacture costs can be reduced. Besides, the tires and the crawler are suitably selected in accordance with the conditions of the place of use. When an industrial vehicle needs to travel on damp ground, soft ground or snow, the rubber crawler is used. When the rubber crawler is unnecessary, the crawler travels with the tires without the rubber crawler.

The crawler is easily attached and detached. Besides, the drive is formed as a skid steering drive for adjusting the extension of the rubber crawler due to inner pressure of the hollow tire.

Since hard covers or sideboards made of metal or hard plastic are fitted on the side surfaces of a tire, air tires or solid tires are prevented from running on the guide protrusions of the crawler. Therefore, the rubber crawler is prevented from coming off the wheels, and the side surfaces of the tire are prevented from being damaged by friction with the guide protrusions.

Since the rubber crawler having the core members embedded at a fixed interval is installed on a drive in which at least one of the front and rear tires at both ends of the longitudinal direction are made as a hollow tire, a rubber crawler drive excellent in driving ability can be provided.

The invention claimed is:

1. A rubber crawler, comprising:
    an endless rubber belt made of rubber elastic material and resin material;
    a tensile strength layer embedded in the endless rubber belt and comprising a plurality of tensile strength bodies extending in the circumferential direction of the rubber crawler and parallel to one another, and arranged in rows in a cross direction of the rubber crawler; and
    guide protrusions for preventing the rubber crawler from coming off tires of a traveling apparatus, the guide protrusions being formed on the inside of the endless rubber belt with respect to the circumferential direction of the rubber crawler and forming an angular 'U' shape so as to contact opposite sides of the tires,
    wherein the inside of the endless rubber belt with respect to the circumferential direction of the rubber crawler is so formed that the height of the inside of the endless rubber belt gradually decreases from the center of the inside to opposite ends of the inside, with respect to a cross direction of the rubber crawler.

2. A rubber crawler traveling apparatus, comprising:
    a traveling mechanism arranged on each of the right and left sides of a vehicle, each said traveling mechanism having at least two tires, including a front tire and a rear tire with respect to the longitudinal direction of the traveling mechanism; and
    a rubber crawler including
        an endless rubber belt made of rubber elastic material and resin material;
        a tensile strength layer embedded in the endless rubber belt and comprising a plurality of tensile strength bodies extending in the circumferential direction of the rubber crawler and parallel to one another, and arranged in rows in a cross direction of the rubber crawler; and
        guide protrusions for preventing the rubber crawler from coming off tires of a traveling apparatus, the guide protrusions being formed on the inside of the endless rubber belt with respect to the circumferential direction of the rubber crawler and forming an angular 'U' shape so as to contact opposite sides of the tires,
        wherein the inside of the endless rubber belt with respect to the circumferential direction of the rubber crawler is so formed that the height of the inside of the endless rubber belt gradually decreases from the center of the inside to opposite ends of the inside, with respect to a cross direction of the rubber crawler,
    wherein a bearing device for interrupting transmission of rotation of bearings to the tires is installed on at least one of the front tire and the rear tire of each traveling mechanism, and the rubber crawler is suspended on the traveling mechanism.

* * * * *